(12) United States Patent
Kunimoto et al.

(10) Patent No.: US 11,050,870 B2
(45) Date of Patent: Jun. 29, 2021

(54) BONE CONDUCTION MICROPHONE, BONE CONDUCTION HEADSET, AND COMMUNICATION DEVICE

(71) Applicant: Panasonic Intellectual Property Management Co., Ltd., Osaka (JP)

(72) Inventors: Hiroshi Kunimoto, Osaka (JP); Suguru Nakao, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 91 days.

(21) Appl. No.: 16/394,205

(22) Filed: Apr. 25, 2019

(65) Prior Publication Data

US 2019/0253809 A1 Aug. 15, 2019

Related U.S. Application Data

(63) Continuation of application No. PCT/JP2017/038436, filed on Oct. 25, 2017.

(30) Foreign Application Priority Data

Oct. 28, 2016 (JP) .............................. JP2016-212351
Feb. 10, 2017 (JP) .............................. JP2017-023463

(51) Int. Cl.
*H04M 1/60* (2006.01)
*H04R 1/10* (2006.01)
(Continued)

(52) U.S. Cl.
CPC .......... *H04M 1/6058* (2013.01); *H01R 13/70* (2013.01); *H04B 1/385* (2013.01);
(Continued)

(58) Field of Classification Search
CPC ... H04R 1/10; H04R 1/00; H04R 1/24; H04R 9/025; H04R 9/063; H04R 7/12;
(Continued)

(56) References Cited

U.S. PATENT DOCUMENTS 5,163,093 A * 11/1992 Frielingsdorf ........... H04R 1/14
381/151
5,359,157 A * 10/1994 Liu .......................... H04R 1/14
181/129
(Continued)

FOREIGN PATENT DOCUMENTS

CN 1930871 3/2007
CN 101437183 5/2009
(Continued)

OTHER PUBLICATIONS

English Translation of Chinese Search Report dated Apr. 17, 2020 in corresponding Chinese Patent Application No. 201780065938.3.
(Continued)

*Primary Examiner* — Oyesola C Ojo
(74) *Attorney, Agent, or Firm* — Wenderoth, Lind & Ponack, L.L.P.

(57) ABSTRACT

A bone conduction microphone is configured to convert vocal cord vibration into a sound signal. The bone conduction microphone includes a vibration collection unit configured to come into contact with a human body and collect vibration in a predetermined direction, which is included in the vocal cord vibration, and a switch configured to switch whether collection of the vibration in the predetermined direction is enabled. The switch is disposed on a side of the vibration collection unit, which is opposite to a side configured to come into contact with the human body, to allow a direction of an operation of switching whether collection
(Continued)

of the vibration in the predetermined direction is enabled to be parallel to the predetermined direction.

8 Claims, 18 Drawing Sheets

(51) Int. Cl.
| | |
|---|---|
| H04R 1/14 | (2006.01) |
| H04R 1/24 | (2006.01) |
| H04R 7/12 | (2006.01) |
| H01R 13/70 | (2006.01) |
| H04B 1/3827 | (2015.01) |
| H04R 9/06 | (2006.01) |
| H04R 31/00 | (2006.01) |
| H04R 9/02 | (2006.01) |
| H04R 25/00 | (2006.01) |

(52) U.S. Cl.
CPC .............. *H04R 1/10* (2013.01); *H04R 1/1008* (2013.01); *H04R 1/1033* (2013.01); *H04R 1/1041* (2013.01); *H04R 1/14* (2013.01); *H04R 1/24* (2013.01); *H04R 7/12* (2013.01); *H04R 9/063* (2013.01); *H04R 31/00* (2013.01); *H04R 9/02* (2013.01); *H04R 25/604* (2013.01); *H04R 2400/03* (2013.01); *H04R 2460/13* (2013.01)

(58) Field of Classification Search
CPC ............ H04R 2400/03; H04R 2460/13; H04R 2400/11; H04R 1/1075
See application file for complete search history.

(56) References Cited

U.S. PATENT DOCUMENTS

| | | | |
|---|---|---|---|
| 6,198,821 B1 | 3/2001 | Yang | |
| 9,620,116 B2* | 4/2017 | Dadu | ............ G10L 15/20 |
| 2003/0112993 A1 | 6/2003 | Teshima et al. | |
| 2006/0079291 A1* | 4/2006 | Granovetter | ............ G10L 15/20 |
| | | | 455/563 |
| 2006/0165246 A1 | 7/2006 | Lee et al. | |
| 2006/0262954 A1 | 11/2006 | Lee et al. | |
| 2007/0216760 A1 | 9/2007 | Kondo et al. | |
| 2008/0163747 A1* | 7/2008 | Uehara | ................ G10H 1/0058 |
| | | | 84/645 |
| 2009/0296948 A1* | 12/2009 | Hood | ..................... A61F 11/14 |
| | | | 381/71.6 |
| 2010/0290660 A1* | 11/2010 | Fukuda | ................. H04R 7/122 |
| | | | 381/355 |
| 2011/0051960 A1 | 3/2011 | Robuchon et al. | |
| 2012/0087519 A1* | 4/2012 | Emilsson | ............... H04R 5/033 |
| | | | 381/151 |
| 2012/0275615 A1 | 11/2012 | Kelly et al. | |
| 2013/0163791 A1 | 6/2013 | Qi et al. | |
| 2013/0288596 A1* | 10/2013 | Suzuki | ................... H04B 11/00 |
| | | | 455/40 |
| 2014/0072148 A1* | 3/2014 | Smith | ...................... H04R 1/08 |
| | | | 381/151 |
| 2015/0030186 A1 | 1/2015 | Qi et al. | |
| 2016/0064012 A1* | 3/2016 | Endo | ..................... H04R 3/005 |
| | | | 704/205 |
| 2016/0316300 A1 | 10/2016 | Qi et al. | |
| 2017/0172493 A1* | 6/2017 | Rahman | ............... A61B 5/7275 |
| 2019/0082266 A1 | 3/2019 | Qi et al. | |

FOREIGN PATENT DOCUMENTS

| | | |
|---|---|---|
| CN | 201294617 | 8/2009 |
| CN | 101834933 | 9/2010 |
| CN | 102332881 | 1/2012 |
| CN | 102938819 | 2/2013 |
| CN | 204425599 | 6/2015 |
| CN | 204465864 | 7/2015 |
| CN | 104898446 | 9/2015 |
| JP | 59-48189 | 3/1984 |
| JP | 4-123743 | 11/1992 |
| JP | 6-54387 | 2/1994 |
| JP | 11-113079 | 4/1999 |
| JP | 2000-59878 | 2/2000 |
| JP | 2000-354829 | 12/2000 |
| JP | 2005-536140 | 11/2005 |
| JP | 2009-159402 | 7/2009 |
| JP | 2009-159447 | 7/2009 |
| JP | 2009-206885 | 9/2009 |
| JP | 2010-10945 | 1/2010 |
| JP | 2010-541512 | 12/2010 |
| JP | 2012-147315 | 8/2012 |
| JP | 2013-527636 | 6/2013 |
| JP | 2013-219532 | 10/2013 |
| JP | 2015-505204 | 2/2015 |
| JP | 2015-126339 | 7/2015 |
| JP | 2016-140005 | 8/2016 |
| WO | 2004/017532 | 2/2004 |

OTHER PUBLICATIONS

English Translation of Chinese Search Report dated Oct. 8, 2019 in Chinese Patent Application No. 201780065938.3.
International Search Report dated Dec. 19, 2017 in International (PCT) Application No. PCT/JP2017/038436.
English Translation of Chinese Search Report dated Oct. 10, 2020 for Chinese Patent Application No. 201780065940.0.

* cited by examiner

SPEAKER CIRCUIT

BONE CONDUCTION MICROPHONE, BONE CONDUCTION HEADSET, AND COMMUNICATION DEVICE

TECHNICAL FIELD

The present disclosure relates to a bone conduction microphone configured to come into contact with a human body and collect vocal cord vibration, as well as a bone conduction headset and a communication device including the bone conduction microphone.

BACKGROUND ART

PTL 1 discloses a bone conduction microphone configured to be attached for use to a helmet, for example. The bone conduction microphone disclosed in PTL 1 includes a sound receiving plate provided on an outer wall surface of a housing of the bone conduction microphone, and a switch provided on another outer wall surface different from the outer wall surface provided with the sound receiving plate. When the bone conduction microphone is used to collect vocal cord vibration, a user has to press the sound receiving plate onto his or her chin or throat, as well as to separately press the switch.

CITATION LIST

Patent Literature

PTL 1: Unexamined Japanese Patent Publication No. 6-54387

SUMMARY OF THE INVENTION

The present disclosure provides a bone conduction microphone and other devices effective for collecting vocal cord vibration.

A bone conduction microphone according to the present disclosure is a bone conduction microphone configured to convert vocal cord vibration into a sound signal, and includes a vibration collection unit configured to come into contact with a human body and collect vibration in a predetermined direction, which is included in the vocal cord vibration, and a switch configured to switch whether collection of the vibration in the predetermined direction is enabled. The switch is disposed on a side of the vibration collection unit, which is opposite to a side configured to come into contact with the human body, to allow a direction of an operation of switching whether collection of the vibration in the predetermined direction is enabled to be parallel to the predetermined direction.

The bone conduction microphone according to the present disclosure can collect vocal cord vibration through a simple operation performed by a user, and is effective for collecting vocal cord vibration.

DESCRIPTION OF EMBODIMENTS

A bone conduction microphone according to the present disclosure is used, in a noise environment such as a construction site, to make communications, through wireless communications, with a partner in a remote location, for example. The bone conduction microphone is used by pressing a part of the bone conduction microphone onto a chin or a throat, for example, to collect, through bone conduction, vocal cord vibration generated from a human body.

Hereinafter, exemplary embodiments will be described in detail with reference to the drawings as appropriate. However, an excessively detailed description will not be given in some cases. For example, detailed descriptions of known matters and duplicated descriptions of substantially the same configurations will be sometimes skipped. This is to avoid the following description from being unnecessarily redundant and thus to help those skilled in the art to easily understand the description.

The accompanying drawings and the following description are only presented to help those skilled in the art fully understand the present disclosure. It is therefore not intended that subject matters described in the scope of the appended claims be limited to the drawings and the description herein.

First Exemplary Embodiment

Hereinafter, a first exemplary embodiment will be described with reference to FIGS. 1 to 5.

1-1. Overall Configuration of Communication Device

Figure 1:
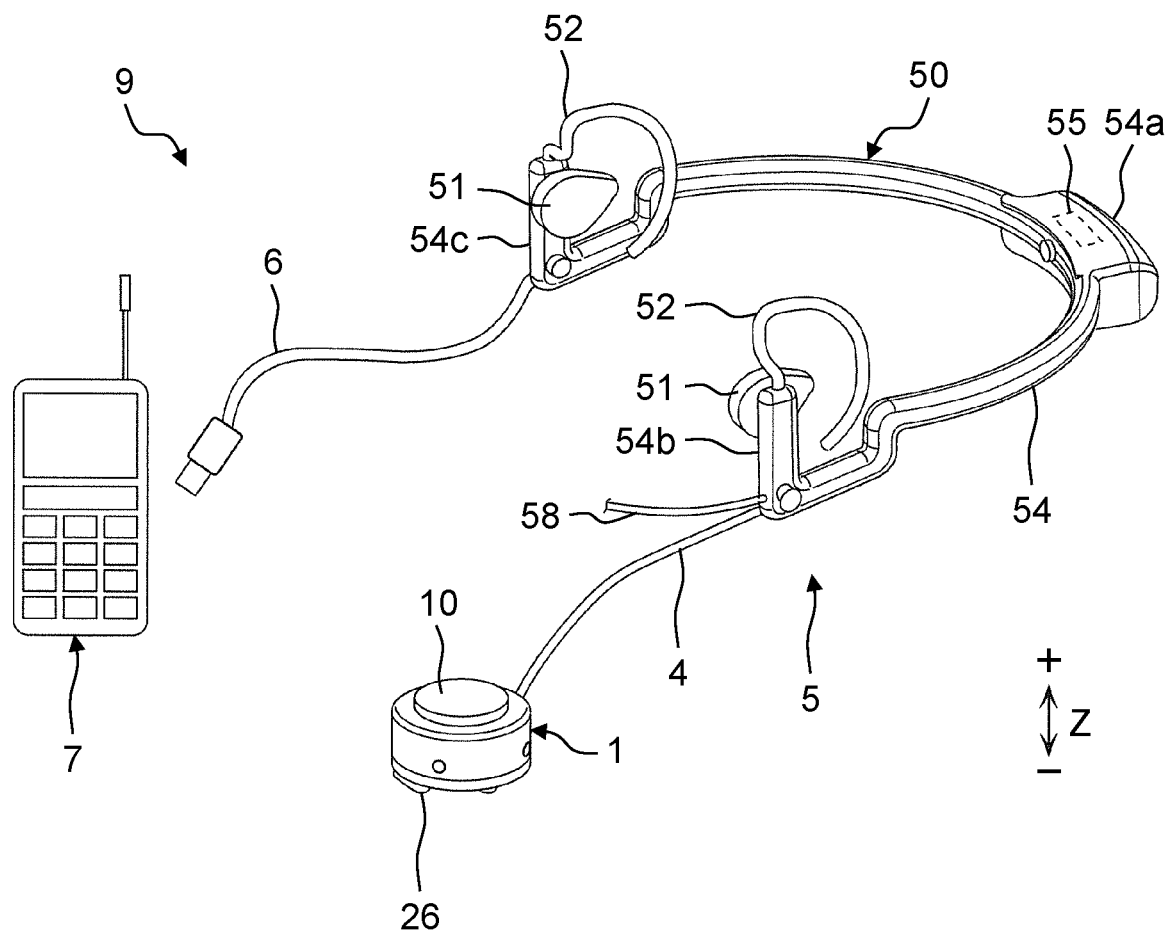
FIG. 1 is a perspective view illustrating a communication device including a bone conduction headset according to a first exemplary embodiment.
Figure 2:
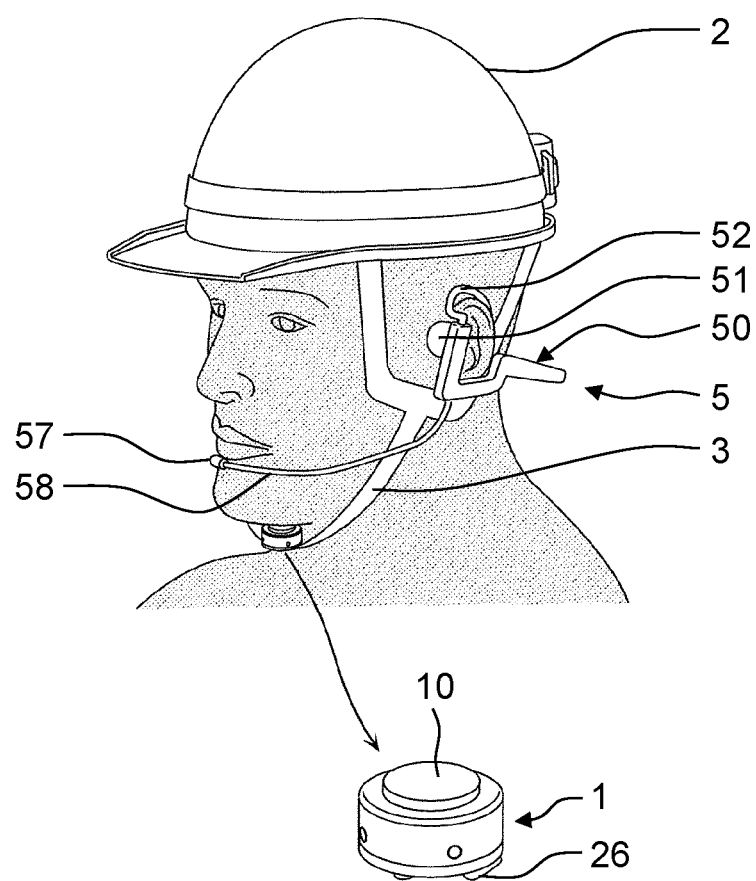
FIG. 2 is a perspective view illustrating an aspect of use of the bone conduction headset including a bone conduction microphone, according to the first exemplary embodiment.

FIG. 1 is a perspective view illustrating communication device 9 including bone conduction headset 5, according to the first exemplary embodiment. FIG. 2 is a view illustrating an aspect of use of bone conduction headset 5 including bone conduction microphone 1.

As illustrated in FIG. 1, communication device 9 includes bone conduction headset 5 including bone conduction microphone 1 and headset main body 50, and transceiver 7. Bone conduction microphone 1 is coupled to headset main body 50 via microphone cable 4. Headset main body 50 includes ear hooks 52. Ear hooks 52 are to be hooked to ears of a human body. Headset main body 50 is thus worn on a head. Headset main body 50 is coupled to transceiver 7 via headset cable 6. Transceiver 7 is attached to a part of a garment, and is configured to perform communications with an external device possessed by a communication partner, for example. Bone conduction microphone 1 may be coupled to controller 55 of headset main body 50, or may not be coupled to controller 55, but may be coupled to transceiver 7 to directly enter a signal into transceiver 7.

As illustrated in FIG. 2, bone conduction microphone 1 is attached to chin strap 3 of helmet 2 with metal fixture 26. Bone conduction microphone 1 includes vibration collection unit 10 configured to come into contact with the human body and collect vocal cord vibration, and housing 21 configured to support vibration collection unit 10. To enter voice into bone conduction microphone 1, a user grips bone conduction microphone 1 and allows vibration collection unit 10 to come into contact with a chin or a throat. Therefore, bone conduction microphone 1 collects vocal cord vibration. When the user does not enter voice, bone conduction microphone 1 is suspended by chin strap 3. At this time, vibration collection unit 10 is detached from the chin or the throat at a predetermined distance and therefore would be less likely to come into contact with the human body.

Bone conduction headset 5 includes sound microphone 57 configured to collect sound via air, and microphone holder 58 configured to support sound microphone 57. For example, bone conduction microphone 1 is to be used under a noise environment, whereas sound microphone 57 is to be used under a non-noise environment. Bone conduction microphone 1 and sound microphone 57 are selectively switched and used.

In FIG. 1, an illustration of sound microphone 57 is omitted. In FIG. 2, an illustration of microphone cable 4 is omitted.

1-2. Configuration of Bone Conduction Microphone

Figure 3:
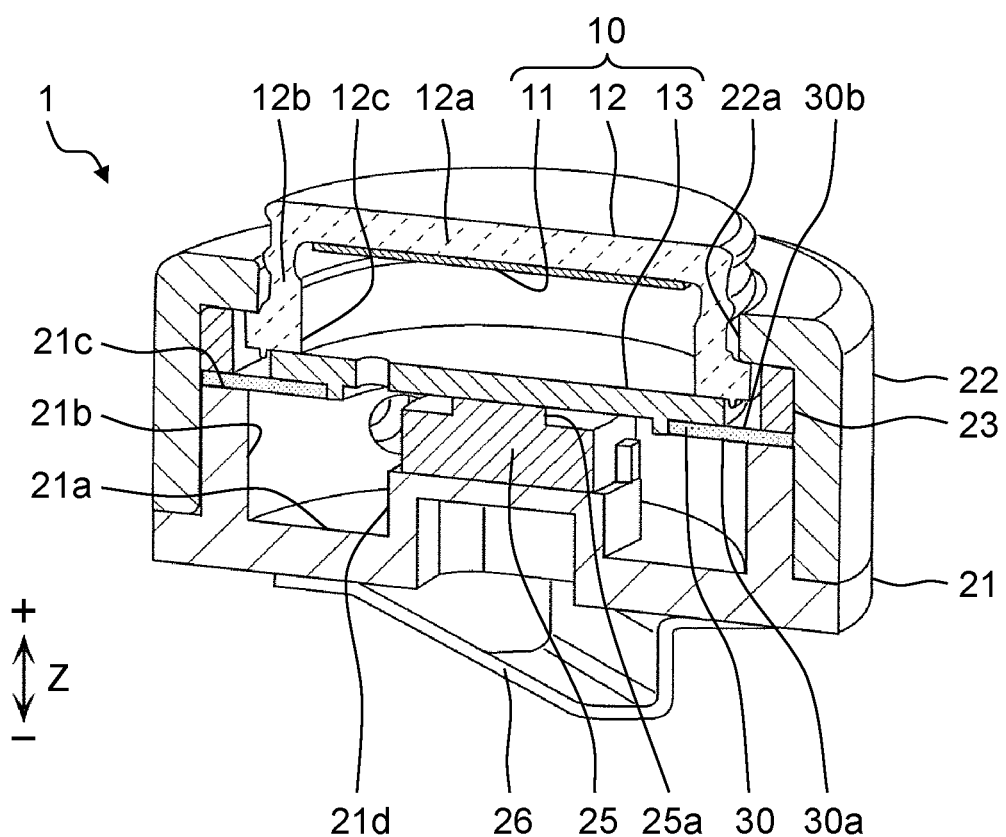
FIG. 3 is a cross-sectional perspective view of the bone conduction microphone according to the first exemplary embodiment.
Figure 4:
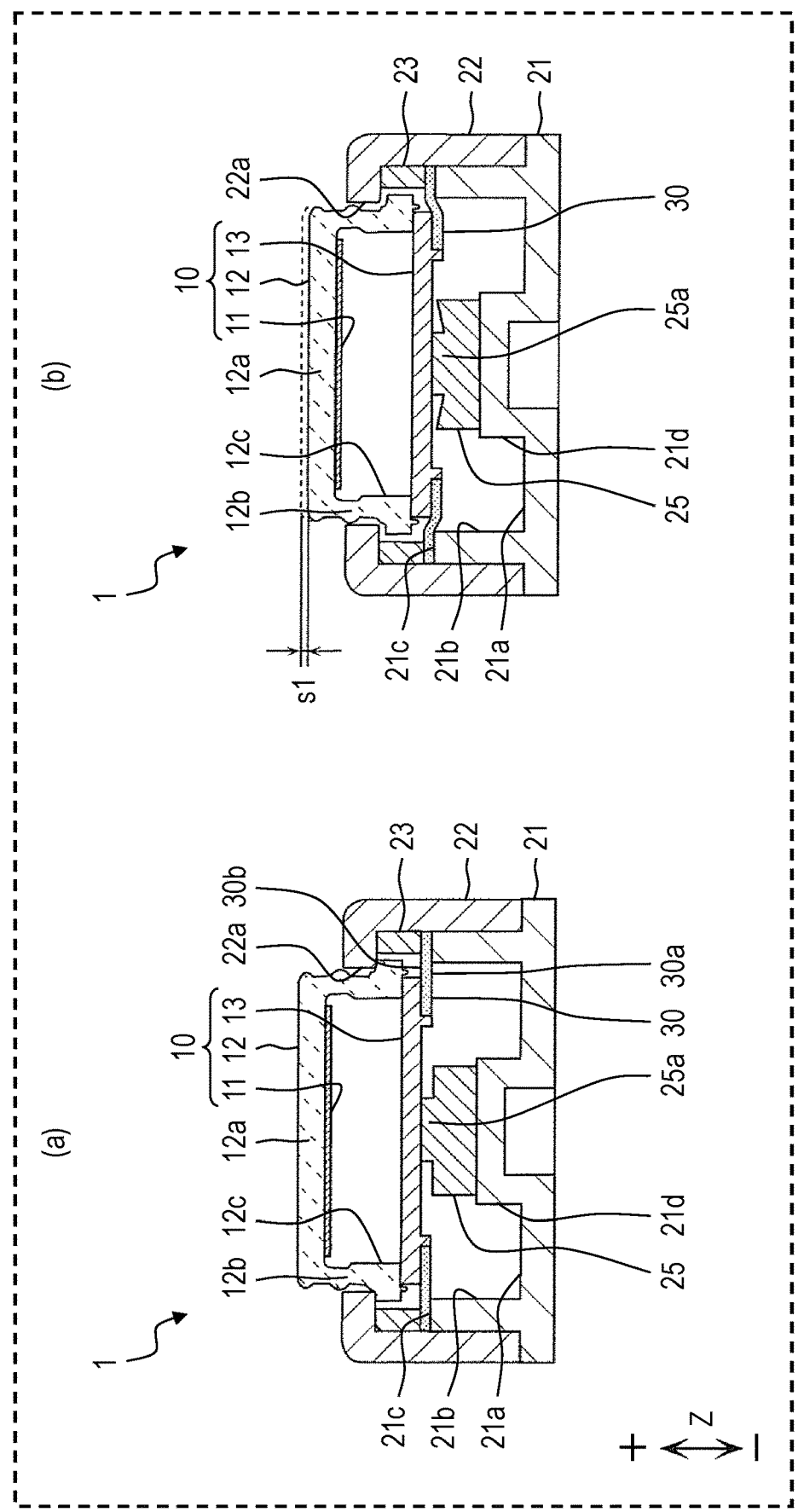
FIG. 4 is cross-sectional views of the bone conduction microphone according to the first exemplary embodiment, including a view illustrating a switch off state and a view illustrating a switch on state.

FIG. 3 is a cross-sectional perspective view of bone conduction microphone 1. FIG. 4 is cross-sectional views of bone conduction microphone 1. Part (a) illustrates a switch off state. Part (b) illustrates a switch on state.

As illustrated in FIGS. 3 and 4, bone conduction microphone 1 includes vibration collection unit 10 configured to collect vocal cord vibration, housing 21 configured to support vibration collection unit 10, and switch 25 configured to switch whether collection of vocal cord vibration by vibration collection unit 10 is enabled.

First, vibration collection unit 10 will be described. Vibration collection unit 10 includes contact member 12 configured to come into contact with the human body, vocal cord sensor 11 supported by contact member 12, and pressing member 13 configured to transmit a pressing force from contact member 12 to switch 25.

Contact member 12 is a member configured to come into contact with the human body to transmit vocal cord vibration being collected to vocal cord sensor 11. Contact member 12 has a bottomed cylindrical shape, and includes side surface part 12b, opening part 12c opening at an end of side surface part 12b, and contact part 12a provided at the other end of side surface part 12b to come into contact with the human body. In FIG. 3, contact part 12a is provided to face a positive side in a Z direction of side surface part 12b, while opening part 12c is provided to face a negative side in the Z direction of side surface part 12b. Side surface part 12b is partially curved outward to have a structure configured to bend and deform to easily absorb vibration noise.

Contact member 12 is an elastic body softer than housing 21, and is made of a resin material such as silicone rubber. A term "soft" denotes both a case in which a material being used is soft and a case in which a structure is soft (e.g., thin or wavy for easy deformation). It is preferable that contact member 12 be made of such a material that provides a comfortable touch feel.

Vocal cord sensor 11 is a detection element configured to detect vibration in a predetermined direction (Z direction), which is included in vocal cord vibration transmitted via contact member 12. Vocal cord sensor 11 is a piezoelectric element having a flat plate shape and configured to allow thickness vibration to occur, for example. Vocal cord sensor 11 is attached to an inner wall of contact part 12a of contact member 12 to be able to deform in the Z direction to allow thickness vibration to occur. Vocal cord sensor 11 is configured to convert vibration detected in the Z direction into an electric signal, and to enter the electric signal into headset main body 50 or transceiver 7. In FIG. 3, an illustration of wire related to vocal cord sensor 11 is omitted. However, a sensor amplifier for vocal cord sensor 11 may be provided in housing 21. The sensor amplifier may be used to amplify an electric signal. The signal may be entered into headset main body 50 or transceiver 7.

Pressing member 13 has a plate shape, and provided on the end of side surface part 12b to cover opening part 12c of contact member 12. Pressing member 13 is made of a resin material or a metal material harder than contact member 12. Below a center of pressing member 13 (adjacent to housing 21), switch 25 described above is disposed. With pressing member 13 made of a material harder than contact member 12, a pressing force received by contact member 12 when a user comes into contact with contact member 12 can be securely transmitted to switch 25.

Pressing member 13 is provided with diaphragm 30 having an annular shape. Specifically, an outer circumference region on a lower surface (surface adjacent to housing 21) of pressing member 13 is adhered with an inner circumference region of upper surface 30b of diaphragm 30. Diaphragm 30 is an elastic body softer than contact member 12, and can easily absorb vibration noise. Diaphragm 30 can more easily deform than contact member 12. A term "easily deform" denotes both a case in which a material that can easily deform is used and a case in which a structure that can easily deform is used. For example, diaphragm 30 may be made from resin film (e.g., polyethylene terephthalate film) or metal film having a thin plate shape to be able to easily deform. Diaphragm 30 made from an elastic body softer than contact member 12 for easy deformation prevents, when contact member 12 receives a pressing force, contact member 12 from being crushed before pressing member 13 presses and turns on switch 25.

Next, housing 21 and switch 25 will be described. Housing 21 is made of a resin material harder than contact member 12. Housing 21 has a cylindrical shape, and includes base 21a provided at an end of the cylindrical shape, and pillar 21b having an annular shape protruding toward the other end from base 21a around an outer circumference of base 21a. Below (opposite to pillar 21b) base 21a, metal fixture 26 described above is provided.

Cover 22 having a cylindrical shape is attached above housing 21. Cover 22 has opening 22a greater than contact member 12. With contact part 12a of contact member 12 being protruded and exposed from opening 22a, base 21a and pillar 21b of housing 21 are covered with cover 22. A predetermined gap is provided between opening 22a of cover 22 and side surface part 12b of contact member 12, suppressing cover 22 and contact member 12 to come into contact with each other.

On end face 21c of pillar 21b of housing 21, diaphragm 30 and vibration collection unit 10 described above are disposed. Diaphragm 30 is disposed to allow an outer circumference region of lower surface 30a to overlap with end face 21c of pillar 21b. On an outer circumference region of upper surface 30b of diaphragm 30, packing 23 made of synthetic rubber and having an annular shape is disposed. As cover 22 is to be attached to housing 21, packing 23 presses diaphragm 30 against pillar 21b. Therefore, the outer circumference region of diaphragm 30 is pinched by packing 23 and pillar 21b.

In other words, diaphragm 30 is positioned between vibration collection unit 10 and housing 21. Vibration collection unit 10 is supported by housing 21 via diaphragm 30. With diaphragm 30 being deformed, vibration collection unit 10 is supported by housing 21 to allow position displacement to occur in the Z direction.

Housing 21 includes switch fixing part 21d configured to attach switch 25. Switch fixing part 21d protrudes from base 21a, and is provided inside pillar 21b.

Switch 25 is provided on switch fixing part 21d. Switch 25 is disposed to allow an on-off operation direction to be parallel to the Z direction, i.e., to be parallel to a direction of vibration to be detected by vocal cord sensor 11.

More specifically, switch 25 is disposed on switch fixing part 21d to allow a central axis extending in the Z direction of switch 25 and a central axis extending in the Z direction of vibration collection unit 10 to align with each other. Therefore, a pressing force applied onto vibration collection unit 10 can efficiently transmit to switch 25, improving ease of operation for a user.

Switch 25 is a tactile switch, for example. Switch 25 is kept an on state while being pressed, and an off state when released. The tactile switch includes a spring for easy absorption of vibration noise. Stroke s1 in the Z direction of operation unit 25a configured to perform switching between on and off is 0.2 mm, for example (see part (b) of FIG. 4). Operation unit 25a of switch 25 is provided to have, while switched off, a gap ranging from 0.1 mm to 0.2 mm inclusive with respect to pressing member 13. The gap may not always be provided. The lower surface of pressing member 13 may be configured to come into contact with operation unit 25a of switch 25.

In bone conduction microphone 1 according to the exemplary embodiment, switch 25 is disposed, as illustrated in part (a) of FIG. 4, in housing 21 in a direction of position displacement (negative side in the Z direction) of vibration collection unit 10. As illustrated in part (b) of FIG. 4, when position displacement occurs on vibration collection unit 10, vibration collection unit 10 presses switch 25. As a result, switch 25 is turned on. As switch 25 is turned on, vocal cord sensor 11 of vibration collection unit 10 can collect vocal cord vibration.

A description based on an operation by the user will be given. As the user grips bone conduction microphone 1, allows vibration collection unit 10 to come into contact with the chin or the throat, and gently presses vibration collection unit 10 onto the chin or the throat, switch 25 is turned on. As the user moves vibration collection unit 10 away from the chin or the throat, switch 25 is turned off.

1-3. Configuration of Bone Conduction Headset

Next, a configuration of bone conduction headset 5 will be described with reference to FIG. 1.

Bone conduction headset 5 includes bone conduction microphone 1 and headset main body 50.

Headset main body 50 includes support body 54 and a pair of speakers 51. Support body 54 has a U-shape, and includes both ends (end 54b, end 54c) facing each other, and central part 54a positioned between both the ends (end 54b, end 54c). Central part 54a of support body 54 denotes a part around a center when support body 54 is viewed along the U-shape. The pair of speakers 51 are respectively supported by both the ends (end 54b, end 54c) to face each other. On one of the ends of support body 54, i.e., end 54b, bone conduction microphone 1 is coupled via microphone cable 4. As illustrated in FIG. 2, on the one of the ends, i.e., end 54b, sound microphone 57 is also coupled via microphone holder 58.

Support body 54 is mainly made of a resin material, and is internally provided with a wire aggregate having elasticity. Support body 54 is internally provided with wires used to couple bone conduction microphone 1, sound microphone 57, controller 55, and speakers 51, for example. Both the ends (end 54b, end 54c) of support body 54 each have a pillar shape extending upward and downward (Z direction). The pair of speakers 51 are respectively provided on upper sides (positive side in the Z direction) of both the ends (end 54b, end 54c). Both the ends (end 54b, end 54c) are respectively provided with ear hooks 52. At central part 54a of support body 54, controller 55 is incorporated.

Figure 5:
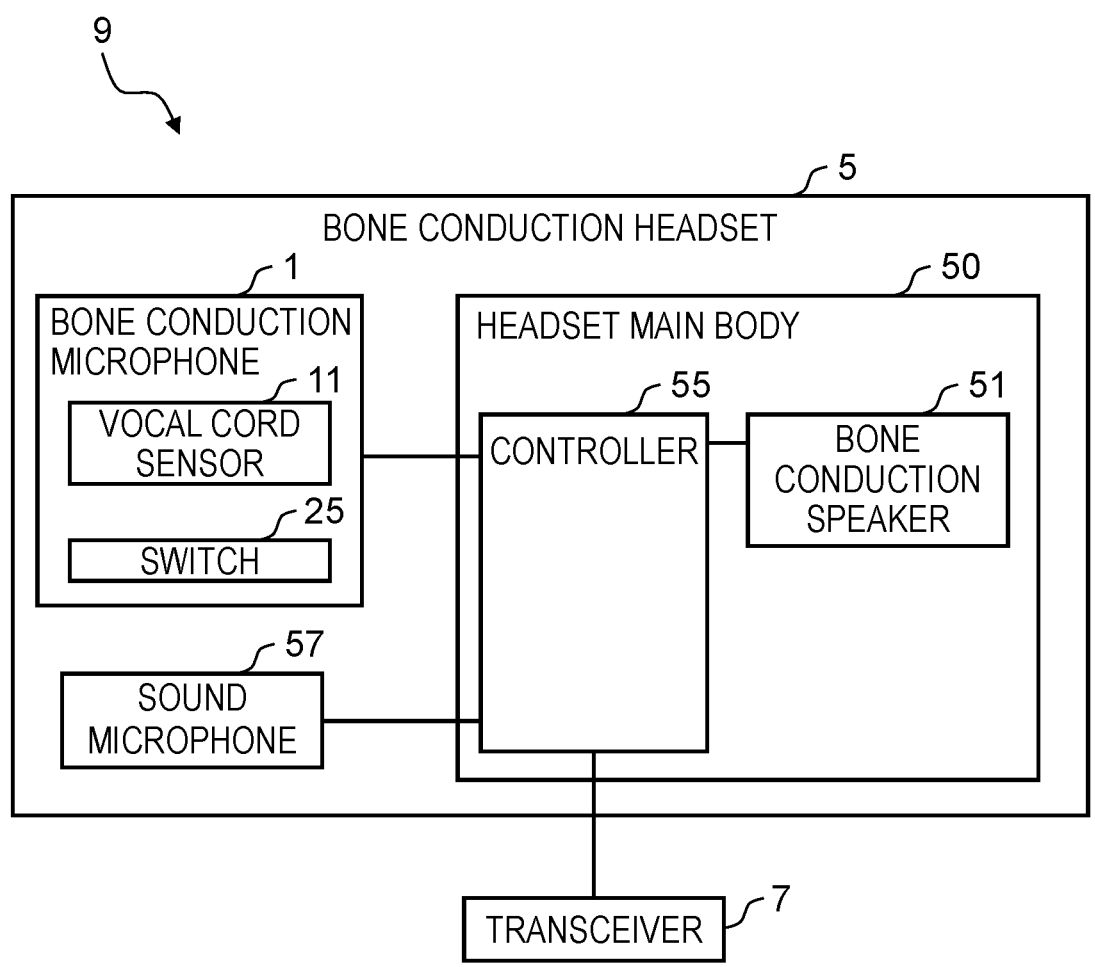
FIG. 5 is a block diagram illustrating a control configuration of the communication device according to the first exemplary embodiment.

FIG. 5 is a block diagram illustrating a control configuration of communication device 9 including bone conduction headset 5.

As illustrated in FIG. 5, communication device 9 includes bone conduction headset 5 and transceiver 7.

Headset main body 50 includes controller 55 and speakers 51. Controller 55 includes a central processing unit (CPU), a random access memory (RAM), and a read only memory (ROM), for example. Speakers 51 are bone conduction speakers, for example, and are coupled to controller 55. Bone conduction microphone 1 including vocal cord sensor 11 and switch 25 is coupled to controller 55. Sound microphone 57 is coupled to controller 55. Controller 55 of headset main body 50 is coupled to transceiver 7.

Communication device 9 is configured to perform wireless communications, via transceiver 7, with an external device possessed by a communication partner. Specifically, signals output from vocal cord sensor 11 and sound microphone 57 enter, via headset main body 50, into transceiver 7. The signals are further sent, via transceiver 7, to the external device possessed by the communication partner. However, while switch 25 of bone conduction microphone 1 is turned on, signals sent from sound microphone 57 do not undergo processing, but only signals sent from vocal cord sensor 11 undergo processing in transceiver 7. On the other hand, transceiver 7 receives signals sent from the external device. Speakers 51 then output the signals via controller 55 of headset main body 50. In a communication method for transceiver 7, a frequency band such as 422 MHz band or 440 MHz band is used.

A signal output from bone conduction microphone 1 may not once enter into controller 55 of headset main body 50, but may directly enter into transceiver 7. In the exemplary embodiment, bone conduction microphone 1, headset main body 50, and transceiver 7 are wire-coupled with each other. However the present disclosure is not limited to the example. The components may be wireless-coupled by using a frequency band such as 2.4 GHz band used in Bluetooth (registered trademark), for example.

1-4. Effects and Other Benefits

As described above, in the exemplary embodiment, bone conduction microphone 1 configured to convert vocal cord vibration into a sound signal includes vibration collection unit 10 configured to come into contact with a human body and collect vibration in the predetermined direction (Z direction in FIGS. 1 to 3), which is included in the vocal cord vibration, and switch 25 configured to switch whether collection of vibration in the predetermined direction is enabled. Switch 25 is disposed on a side of the vibration collection unit, which is opposite to a side configured to come into contact with the human body, to allow the direction of the operation of switching whether collection of the vibration in the predetermined direction is enabled to be parallel to the predetermined direction.

Therefore, when switch 25 is operated in the predetermined direction, vibration collection unit 10 can easily collect vocal cord vibration in the predetermined direction. Therefore, bone conduction microphone 1 can easily collect vocal cord vibration with a simple operation.

In the exemplary embodiment, when vibration collection unit 10 is pressed onto a human body, switch 25 of bone conduction microphone 1 is turned on. When vibration collection unit 10 is detached from the human body, switch 25 is turned off. When switch 25 is in an on state, vibration collection unit 10 collects vibration in the predetermined direction. When switch 25 is in an off state, vibration collection unit 10 does not collect vibration in the predetermined direction.

Therefore, as vibration collection unit 10 is pressed onto or detached from a human body, switch 25 switches whether collection of vocal cord vibration is enabled. Therefore, bone conduction microphone 1 can easily collect vocal cord vibration with a simple operation. In particular, the bone conduction microphone is supposed to be used during work under a noise environment such as building site, construction site, factory, and distribution warehouse. Bone conduction microphone 1 according to the exemplary embodiment can collect vocal cord vibration with a simple operation. Therefore, bone conduction microphone 1 does not hinder the user at work, achieving higher ease of operation.

In the exemplary embodiment, vibration collection unit 10 includes contact member 12 configured to come into contact with a human body, and vocal cord sensor 11 configured to detect vibration in the predetermined direction via contact member 12. Bone conduction microphone 1 further includes housing 21 configured to support contact member 12 and switch 25. Contact member 12 is an elastic body softer than housing 21.

Vocal cord sensor 11 is supported by housing 21 via contact member 12 that is soft. Therefore, vocal cord sensor 11 would be less likely to accept external vibration noise transmitted to housing 21 and vibration noise generated in housing 21. Therefore, bone conduction microphone 1 can easily collect vocal cord vibration.

In the exemplary embodiment, bone conduction microphone 1 further includes diaphragm 30 positioned between vibration collection unit 10 and housing 21. Vibration collection unit 10 is supported by housing 21 via diaphragm 30.

Vocal cord sensor 11 of vibration collection unit 10 is supported by housing 21 via diaphragm 30. Therefore, vocal cord sensor 11 would be less likely to accept external vibration noise transmitted to housing 21 and vibration noise generated in housing 21. Therefore, bone conduction microphone 1 can easily collect vocal cord vibration.

In the exemplary embodiment, diaphragm 30 is an elastic body softer than contact member 12.

Therefore, external vibration noise transmitted to housing 21 and vibration noise generated in housing 21 are absorbed by soft diaphragm 30, and would be less likely to enter into vocal cord sensor 11. Therefore, bone conduction microphone 1 can easily collect vocal cord vibration.

In the exemplary embodiment, housing 21 has a tubular shape.

Vibration collection unit 10 is supported by housing 21 via diaphragm 30 to allow position displacement to occur in the operation direction of switch 25. Switch 25 is disposed in housing 21 in the direction of position displacement of vibration collection unit 10. When position displacement occurs on vibration collection unit 10, vibration collection unit 10 presses switch 25. As a result, switch 25 is turned on.

Vibration collection unit 10 then collects vibration in the predetermined direction (Z direction) described above.

Therefore, as switch 25 is operated in the predetermined direction, vibration collection unit 10 is ready to collect vocal cord vibration in the predetermined direction. Therefore, bone conduction microphone 1 can easily collect vocal cord vibration with a simple operation.

In the exemplary embodiment, vibration collection unit 10 and switch 25 are disposed in housing 21 to allow the central axes extending in the direction of position displacement (Z direction) to align with each other.

Therefore, a pressing force applied onto vibration collection unit 10 can efficiently transmit to switch 25, improving ease of operation for a user.

In the exemplary embodiment, vocal cord sensor 11 is a piezoelectric element configured to provide thickness vibration. A thickness direction of the piezoelectric element is identical to the predetermined direction (Z direction) described above.

Therefore, vocal cord sensor 11 can easily collect vibration in the predetermined direction, which is included in vocal cord vibration.

In the exemplary embodiment, bone conduction headset 5 includes bone conduction microphone 1 and speakers 51.

With bone conduction headset 5 equipped with bone conduction microphone 1, bone conduction headset 5 can easily collect vocal cord vibration with a simple operation.

In the exemplary embodiment, communication device 9 includes bone conduction headset 5, and transceiver 7 coupled to bone conduction headset 5 to perform communications with an external device.

With communication device 9 equipped with bone conduction headset 5 described above, communication device 9 can easily collect vocal cord vibration with a simple operation, achieving easy communications.

In the exemplary embodiment, communication device 9 includes bone conduction microphone 1, and transceiver 7 coupled to bone conduction microphone 1 to perform communications with an external device.

With communication device 9 equipped with bone conduction microphone 1, communication device 9 can easily collect vocal cord vibration with a simple operation, achieving easy communications.

Second Exemplary Embodiment

Bone conduction headset 5A and communication device 9A according to a second exemplary embodiment will be described below with reference to FIGS. 6 to 10.

2-1. Overall Configuration of Communication Device

Figure 6:
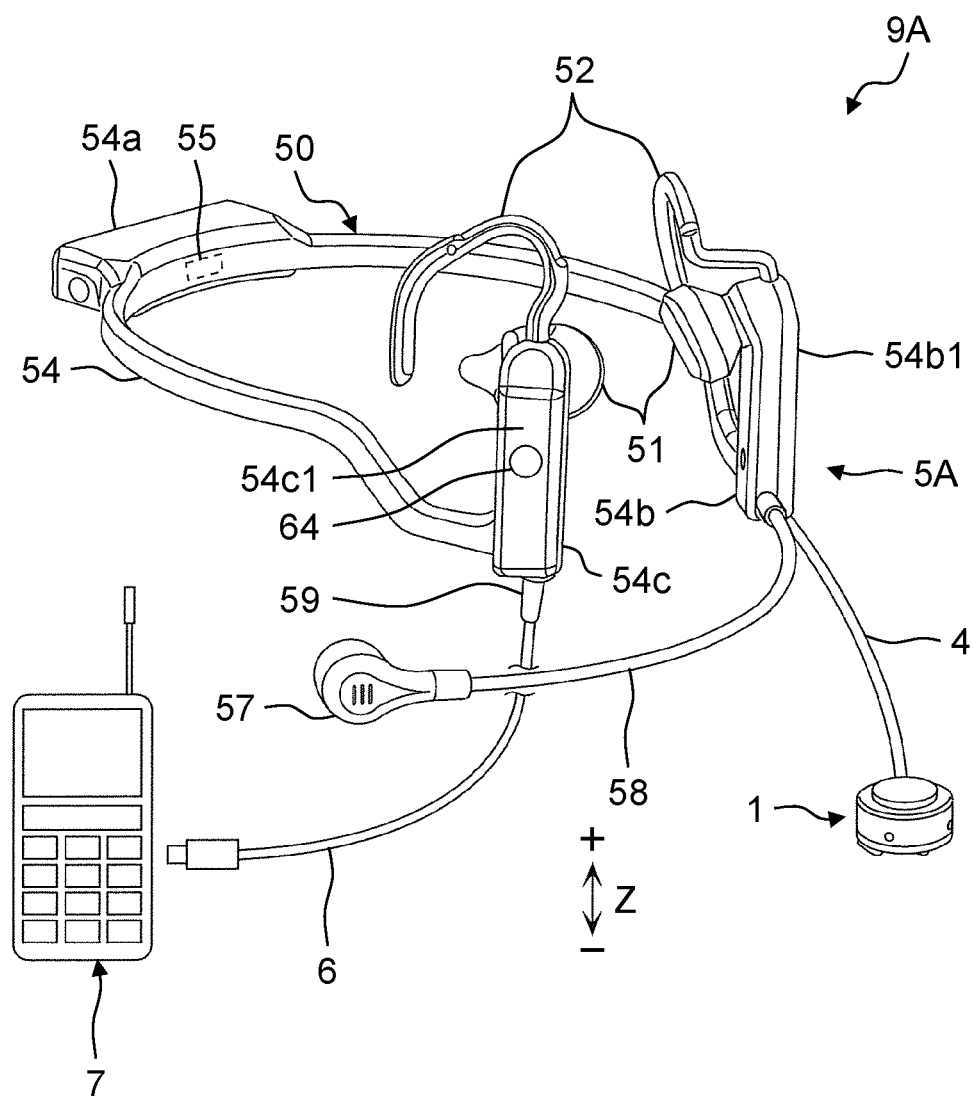
FIG. 6 is a perspective view illustrating a communication device including a bone conduction headset according to a second exemplary embodiment.
Figure 7:
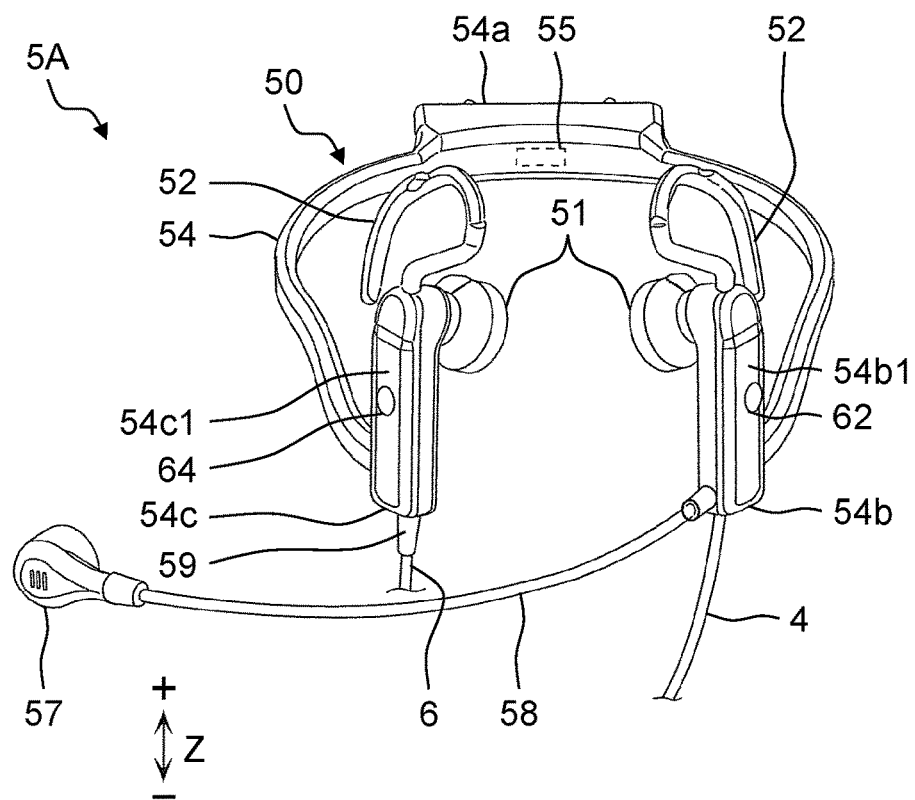
FIG. 7 is a perspective view of the bone conduction headset in FIG. 6, when viewed differently in angle from FIG. 6.
Figure 8:
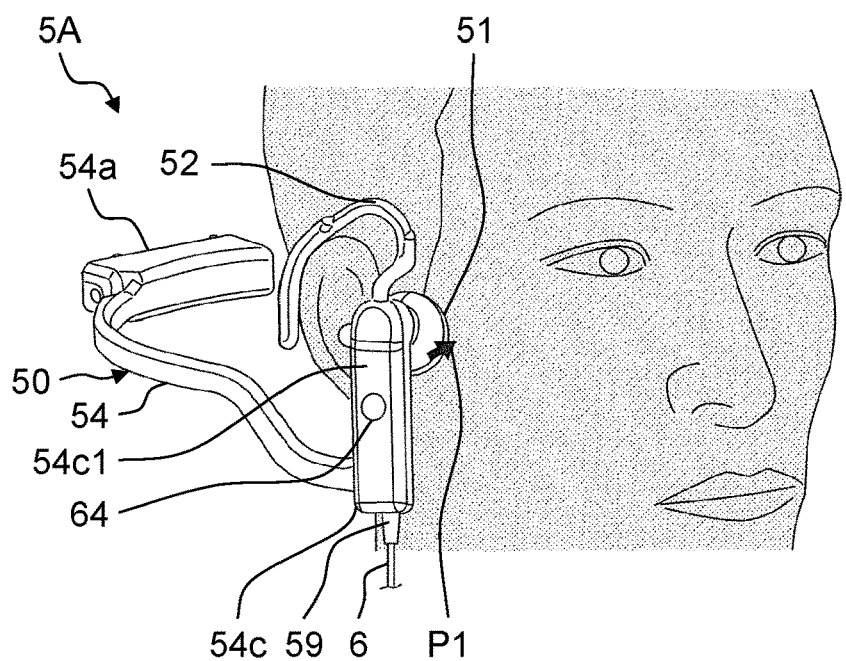
FIG. 8 is a perspective view illustrating an aspect of use of the bone conduction headset according to the second exemplary embodiment.

FIG. 6 is a perspective view illustrating communication device 9A including bone conduction headset 5A. FIG. 7 is a perspective view of bone conduction headset 5A, when viewed differently in angle from FIG. 6. FIG. 8 is a perspective view illustrating an aspect of use of bone conduction headset 5A.

As illustrated in FIGS. 6 and 7, communication device 9A includes bone conduction headset 5A including sound microphone 57 and headset main body 50, and transceiver 7. Sound microphone 57 is coupled to headset main body 50 via microphone holder 58. Headset main body 50 includes a pair of speakers 51 and a pair of ear hooks 52. Ear hooks 52 are to be hooked to ears of a human body. Headset main body 50 is thus worn on a head. Speakers 51 are wire-coupled to transceiver 7 via headset cable 6. Transceiver 7 is attached to a part of a garment, and is configured to perform communications with an external device possessed by a communication partner, for example. Sound microphone 57 may be coupled to controller 55 of headset main body 50 or may not be coupled to controller 55, but may be coupled to transceiver 7 to directly enter a signal into transceiver 7.

Bone conduction headset 5A includes bone conduction microphone 1 configured to collect vocal cord vibration through bone conduction, and microphone cable 4 used to couple bone conduction microphone 1 to headset main body 50. For example, bone conduction microphone 1 is to be used under a noise environment, whereas sound microphone 57 is to be used under a non-noise environment. Bone conduction microphone 1 and sound microphone 57 are selectively switched and used.

2-2. Configuration of Bone Conduction Headset

Bone conduction headset 5A includes sound microphone 57 configured to collect sound via air, bone conduction microphone 1, and headset main body 50. A configuration of bone conduction microphone 1 is similar to the configuration described in the first exemplary embodiment. Therefore, a detailed description is omitted.

Headset main body 50 includes support body 54 and a pair of speakers 51. Specifically, speakers 51 are bone conduction speakers configured to transmit sound information through bone conduction to a brain without drum membranes being interposed. Support body 54 has a U-shape, and includes both ends (end 54b, end 54c) facing each other, and central part 54a positioned between both the ends (end 54b, end 54c). Central part 54a of support body 54 denotes a part around a center when support body 54 is viewed along the U-shape. The pair of speakers 51 are respectively supported by both the ends (end 54b, end 54c) to face each other.

On one end of support body 54, i.e., end 54b, sound microphone 57 is coupled via microphone holder 58, as well as bone conduction microphone 1 is coupled via microphone cable 4. On the other end of support body 54, i.e., end 54c, transceiver 7 is coupled via headset cable 6. A connector may be used as coupler 59 configured to couple headset cable 6 and end 54c to allow headset cable 6 to be attached to and detached from end 54c.

Support body 54 is mainly made of a resin material, and is internally provided with a wire aggregate having elasticity. Support body 54 is internally provided with wires used to couple sound microphone 57, bone conduction microphone 1, controller 55, and speakers 51, as well as PTT switch 62 and mute switch 64 described later, for example. Both the ends (end 54b, end 54c) of support body 54 each have a pillar shape extending upward and downward (Z direction). The pair of speakers 51 are respectively provided on upper sides (positive side in the Z direction) of both the ends (end 54b, end 54c). Both the ends (end 54b, end 54c) are respectively provided with ear hooks 52. At central part 54a of support body 54, controller 55 is incorporated.

Support body 54 has elasticity. Parts other than central part 54a can thus easily deform. Specifically, support body 54 has a structure allowing the parts other than central part 54a to deform to change a distance between both the ends (end 54b, end 54c) facing each other. An elastic force of support body 54 is adjusted to allow, when headset main body 50 is worn on the head, pressing force P1 to be appropriately applied to sides of the head without allowing speakers 51 to detach from skin on areas in front of the ears, as well as to press the skin excessively. Support body 54 is formed, when headset main body 50 is worn, to extend from both the ends (end 54*b*, end 54*c*), through lower sides of the ears, to central part 54*a* lying on a rear side of the head. As the lower sides of the ears are bypassed, a pair of eyeglasses can be easily worn. With the form extending to central part 54*a* lying on the rear side of the head, a helmet or a cap can be easily worn.

Bone conduction headset 5A according to the exemplary embodiment includes push to talk (PTT) switch 62 used to make communications with a communication partner holding an external device, and mute switch 64 used to lower sound entering from the external device.

PTT switch 62 is provided to end 54*b* without being coupled with headset cable 6. Specifically, PTT switch 62 is provided to outside surface 54*b*1 of end 54*b*. PTT switch 62 is turned on when a button is pressed in a direction vertical to outside surface 54*b*1, i.e., toward a left side surface of a face. When PTT switch 62 is turned on, the user can make communications with the communication partner. It is preferable that PTT switch 62 be provided to face the positive side in the Z direction from a center of outside surface 54*b*1. Further, it is more preferable that PTT switch 62 be provided on a rear surface of corresponding one of speakers 51. This prevents headset main body 50 from moving from the head even when the user presses the button.

Mute switch 64 is provided to end 54*c* coupled with headset cable 6. In other words, mute switch 64 is provided to end 54*c* opposite to end 54*b* provided with PTT switch 62. Mute switch 64 is inserted and coupled to a wire that couples coupler 59 and speaker 51 on end 54*b*, as well as inserted and coupled to a wire that couples coupler 59 and speaker 51 on end 54*c*. Mute switch 64 according to the exemplary embodiment includes an operation unit (button) configured to accept an operation by a user, as well as includes a resistor and a contact (switch) provided in a speaker circuit described later.

Mute switch 64 is provided to outside surface 54*c*1 of end 54*c*. Mute switch 64 operates when the button is pressed in a direction vertical to outside surface 54*c*1, i.e., toward a right side surface of the face. Similar to PTT switch 62, it is preferable that mute switch 64 be provided to face the positive side in the Z direction from a center of outside surface 54*c*1 to prevent the headset main body from moving from the head even when the button is pressed. It is more preferable that mute switch 64 be provided to outside surface 54*c*1 of end 54*c*, i.e., on a rear surface of corresponding one of speakers 51. While mute switch 64 is pressed, volume of sound signals from transceiver 7 lowers. As mute switch 64 is released, volume of sound signals from transceiver 7 returns to its original degree.

A pressing force required to operate mute switch 64 is set to approximately ½ to ¼ inclusive of pressing force P1 that each of the sides of the head receives when headset main body 50 is worn (see FIG. 8). That is, with the set force smaller than pressing force P1, headset main body 50 is prevented from moving from the head even when mute switch 64 is pressed.

Figure 9:
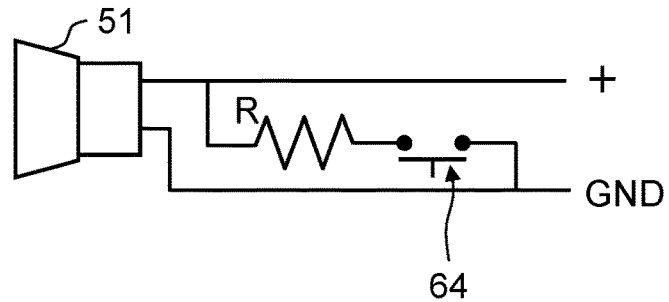
FIG. 9 is a view illustrating a speaker circuit of the bone conduction headset according to the second exemplary embodiment.

FIG. 9 is a circuit diagram illustrating the speaker circuit of bone conduction headset 5A according to the second exemplary embodiment.

In the speaker circuit according to the exemplary embodiment, the resistor and mute switch 64 are bypass-inserted between a positive side wire and a ground side wire for speakers 51. As the user presses the button of mute switch 64, the contact closes. Therefore, the resistor is coupled to the speaker circuit, lowering a level of sound to be output from speakers 51.

Figure 10:
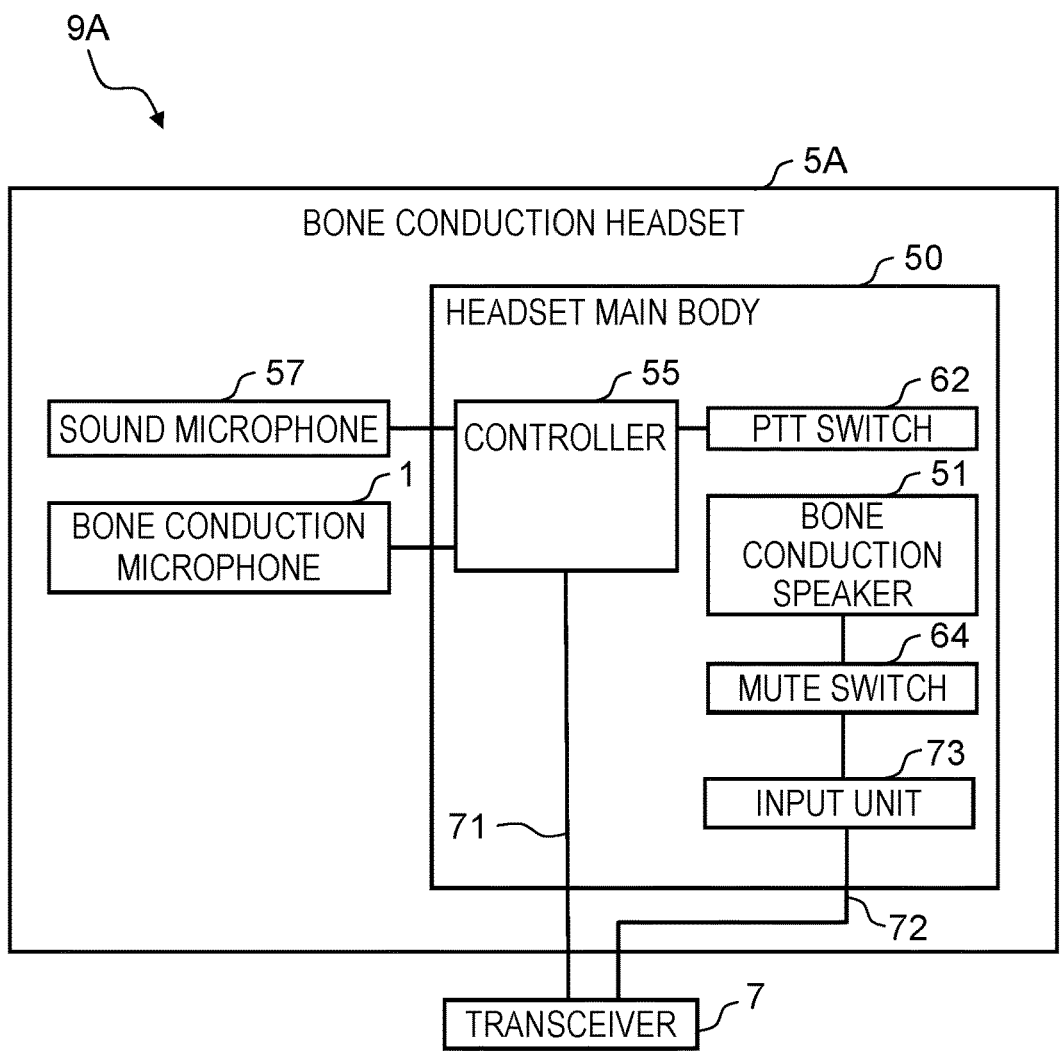
FIG. 10 is a block diagram illustrating a control configuration of the communication device according to the second exemplary embodiment.

FIG. 10 is a block diagram illustrating a control configuration of communication device 9A including bone conduction headset 5A.

As illustrated in FIG. 10, headset main body 50 includes controller 55 and speakers 51. Controller 55 includes a central processing unit (CPU), a random access memory (RAM), and a read only memory (ROM), for example. Specifically, speakers 51 are bone conduction speakers, and are coupled to transceiver 7 via mute switch 64.

Sound microphone 57 and bone conduction microphone 1 are coupled to controller 55. PTT switch 62 is coupled to controller 55. Controller 55 is coupled to transceiver 7 via signal line 71. Mute switch 64 is provided on a signal line distinct from signal line 71, i.e., provided on sound line 72 configured to accept outputs from transceiver 7. Sound line 72 of headset main body 50 is coupled with input unit 73 configured to accept sound signals from transceiver 7. Input unit 73 is provided to end 54*c*, similar to mute switch 64. A sound signal entered into input unit 73 enters into bone conduction speakers 51.

Communication device 9A performs wireless communications, via transceiver 7, with an external device possessed by a communication partner. Specifically, signals output from sound microphone 57 and bone conduction microphone 1 enter transceiver 7 via headset main body 50. Further, the signals are sent, via transceiver 7, to the external device possessed by the communication partner. On the other hand, a signal sent from the external device is received by transceiver 7, and is then analog-converted. Further, the signal is output, via headset cable 6 and mute switch 64, from speakers 51. In a communication method for transceiver 7, a frequency band such as 422 MHz band or 440 MHz band is used. Bone conduction headset 5A may perform communications with a plurality of external communication apparatuses via transceiver 7.

By pressing PTT switch 62, the user can make communications with the communication partner. The user can press mute switch 64 to lower sound from the communication partner.

2-3. Effects and Other Benefits

As described above, in the exemplary embodiment, bone conduction headset 5A includes support body 54 having a U-shape, the pair of bone conduction speakers 51 respectively provided to one of ends of support body 54, i.e., first end 54*b*, and another one of the ends, which lies opposite to first end 54*b*, i.e., second end 54*c*, sound microphone 57 coupled to first end 54*b*, and mute switch 64 provided to either of first end 54*b* or second end 54*c*, and configured to control bone conduction speakers 51 to lower volume.

Therefore, a user can operate mute switch 64 provided to bone conduction headset 5A to lower volume on bone conduction speakers 51. For example, while the user wearing bone conduction headset 5A is making conversations with an adjacent partner, if the user hears other communications via bone conduction speakers 51 from transceiver 7, the user faces difficulty in making conversations with the adjacent partner. In this case, the user can operate mute switch 64 to lower volume on bone conduction speakers 51 to continue smooth conversations.

In the exemplary embodiment, the pair of bone conduction speakers 51 include the speaker circuit. Mute switch 64 includes the button configured to accept an operation by the user, the resistor configured to be coupled with the speaker circuit, and the switch configured to couple the resistor to the speaker circuit. When the button is operated, the switch closes. The resistor is coupled to the speaker circuit. Volume on bone conduction speakers 51 thus lowers.

As described above, bone conduction headset 5A can lower volume on bone conduction speakers 51 without fully silencing sound. If sound is fully silenced, the user cannot respond to an instruction given from the communication partner to complete a task or cannot answer the communication partner. However, by lowering volume without fully silencing sound, the user can respond to the communication partner as required.

In the exemplary embodiment, first end 54b or second end 54c is not provided with mute switch 64, but is provided with PTT switch 62 configured to switch on or off of an input of sound microphone 57.

PTT switch 62 and mute switch 64 are respectively provided to ends 54b, 54c distinct from each other. Therefore, PTT switch 62 and mute switch 64 would be less likely to be unintentionally pressed.

In the exemplary embodiment, bone conduction headset 5A includes coupler 59 and headset cable 6 both used to couple transceiver 7, and is configured to perform communications with a plurality of external communication apparatuses via transceiver 7.

Therefore, bone conduction headset 5A can perform communications with the plurality of external communication apparatuses. In the situation, even when the user hears from transceiver 7 communications that are not directed to the user, the user can operate mute switch 64 to lower volume on bone conduction speakers 51. By lowering volume of communications that are not directed to the user, the user can smoothly make conversations with an adjacent partner, and, further, can concentrate the user's task.

In the exemplary embodiment, bone conduction headset 5A includes support body 54 having a U-shape, speakers 51 respectively provided to one end of support body 54, i.e., end 54b, and the other end, i.e., end 54c, headset cable 6 for accepting sound from an external device, and mute switch 64 configured to lower sound entering from the external device. Headset cable 6 and mute switch 64 are both provided to either of the ends, i.e., end 54b and end 54c.

In the exemplary embodiment, second end 54c includes input unit 73 configured to accept a sound signal entering from transceiver 7. Mute switch 64 is also provided to second end 54c.

Therefore, wiring inside support body 54 can be simplified. If headset cable 6 and input unit 73 are provided to end 54b, and mute switch 64 is provided to end 54c, a wire in end 54b coupled with headset cable 6 and input unit 73 needs to be inserted into support body 54, and coupled to mute switch 64 on end 54c. The wire then needs to be folded, inserted into support body 54, and coupled to speaker 51 on end 54b. In the exemplary embodiment, headset cable 6, input unit 73, and mute switch 64 are all provided to one of the ends of support body 54. Therefore, a wire does not need to be folded, shortening a wire length. Therefore, wiring inside bone conduction headset 5A can be simplified.

In the exemplary embodiment, a pressing force required to operate mute switch 64 ranges from ½ to ¼ inclusive of pressing force P1 to be applied to each of the sides of the head when headset main body 50 is worn.

Therefore, even when mute switch 64 is pressed, bone conduction headset 5A can be easily prevented from moving from the head.

In the exemplary embodiment, the operation unit (button) of mute switch 64 is disposed on outside surface 54b1 of first end 54b or outside surface 54c1 of second end 54c, in other words, on an upper side above the center of outside surface 54b1 or outside surface 54c1, i.e., disposed to face the positive side in the Z direction.

Therefore, even when mute switch 64 is pressed, bone conduction headset 5A can be easily prevented from moving from the head.

2-4. Modification Examples

In the second exemplary embodiment, one of the ends of support body 54, i.e., end 54b, is coupled with sound microphone 57 via microphone holder 58, as well as is coupled with bone conduction microphone 1 via microphone cable 4.

Here is described, as modification examples to the second exemplary embodiment, cases where bone conduction microphone 1 and sound microphone 57 are detachably and replaceably coupled to headset main body 50.

First, a coupler including connector 170 is provided to end 54b of headset main body 50. Connector 180 is used at an end of microphone cable 4, which is to be coupled to bone conduction microphone 1, i.e., to be coupled to headset main body 50. Connector 190 is used at an end of microphone holder 58 to be coupled to sound microphone 57, i.e., to be coupled to bone conduction headset 5A. With this configuration, bone conduction microphone 1 and sound microphone 57 are detachable and replaceable with respect to headset main body 50.

At this time, when the coupler at end 54b is coupled with sound microphone 57, communications with a communication partner may be possible when PTT switch 62 is in an on state. When the coupler at end 54b is coupled with bone conduction microphone 1, communications with a communication partner may be possible when switch 25 is in an on state.

How to operate PTT switch 62 provided to headset main body 50 and switch 25 provided to bone conduction microphone 1 will be described below with reference to FIGS. 11, 12.

Figure 11:
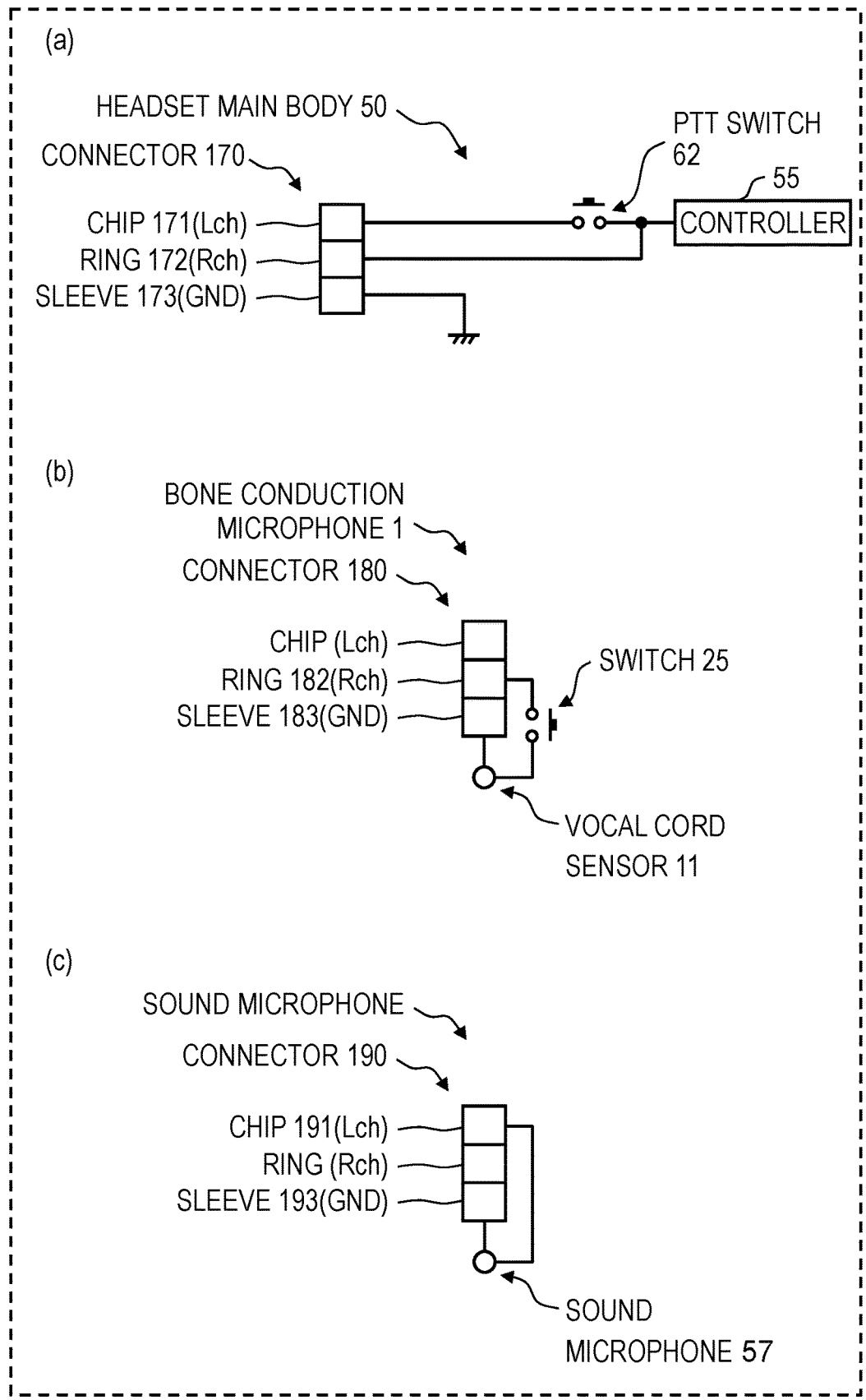
FIG. 11 is circuit diagrams relating to modification example 1 to the second exemplary embodiment, including a circuit diagram of a headset main body, a circuit diagram of a bone conduction microphone, and a circuit diagram of a sound microphone.

FIG. 11 is circuit diagrams relating to modification example 1 to the second exemplary embodiment. Part (a) is a circuit diagram of headset main body 50. Part (b) is a circuit diagram of bone conduction microphone 1. Part (c) is a circuit diagram of sound microphone 57.

As illustrated in part (a) of FIG. 11, connector 170 of the coupler at end 54b is a female stereo jack (three-polar jack). Chip 171 (Lch) of connector 170 is coupled to controller 55 via PTT switch 62. Ring 172 (Rch) of connector 170 is directly coupled to controller 55. Sleeve 173 (GND) of connector 170 is coupled to GND.

As illustrated in part (b) of FIG. 11, connector 180 of bone conduction microphone 1 is a male stereo jack (three-polar jack). A signal picked by vocal cord sensor 11 is output from ring 182 (Rch) of connector 180. Switch 25 is inserted between vocal cord sensor 11 and ring 182 (Rch). The details on switch 25 have been described in the first exemplary embodiment.

As illustrated in part (c) of FIG. 11, connector 190 of sound microphone 57 is a male stereo jack (three-polar jack). A signal picked by sound microphone 57 is output from chip 191 (Lch) of connector 190.

With the configuration described above, when bone conduction microphone 1 is coupled to headset main body 50, connector 180 is inserted into connector 170. Therefore, conversations can be controlled with switch 25 provided to bone conduction microphone 1. On the other hand, when headset main body 50 is coupled to sound microphone 57, connector 190 is inserted into connector 170. Therefore, conversations can be controlled with PTT switch 62 provided to end 54b of bone conduction headset 5A.

Figure 12:
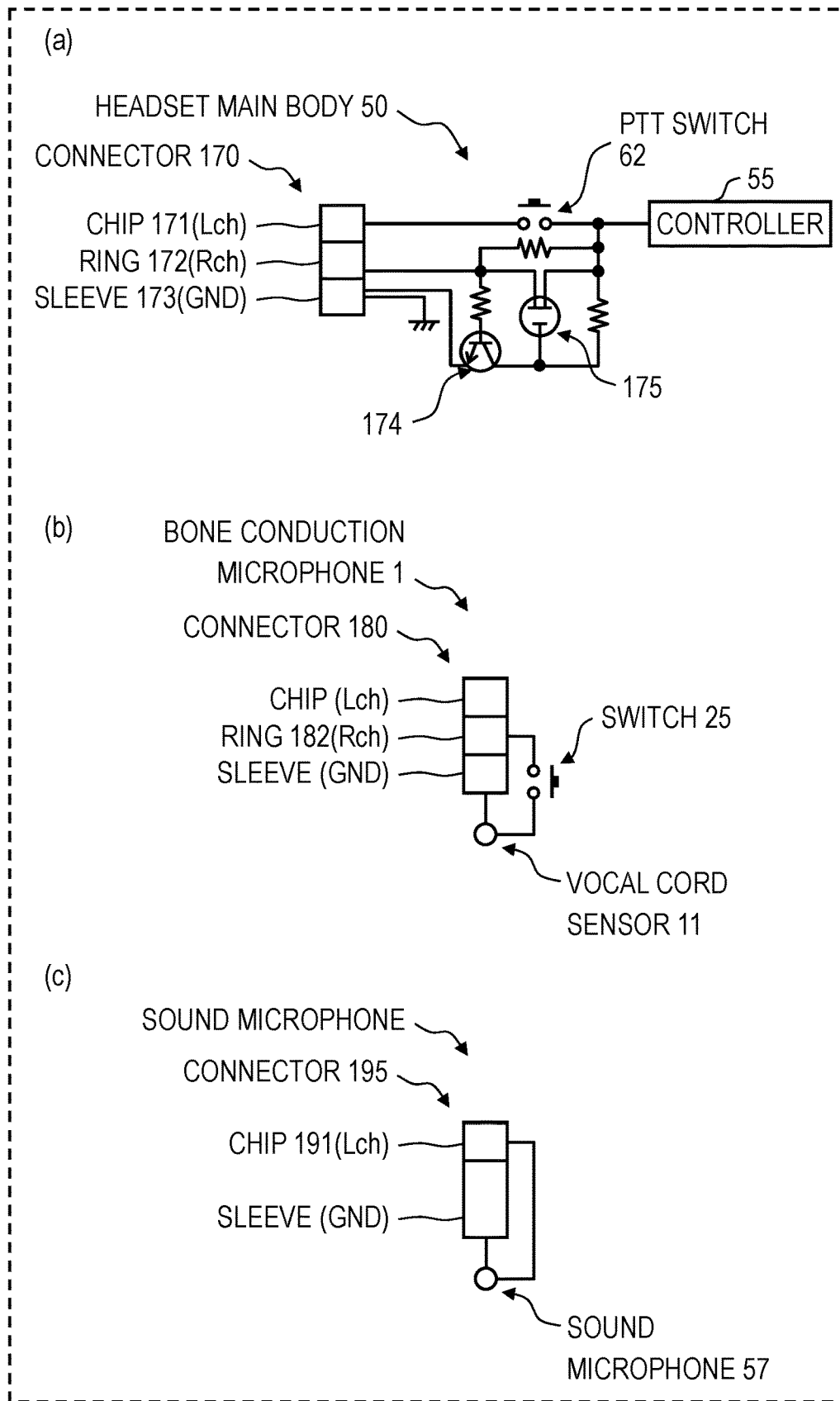
FIG. 12 is circuit diagrams relating to modification example 2 to the second exemplary embodiment, including a circuit diagram of a headset main body, a circuit diagram of a bone conduction microphone, and a circuit diagram of a sound microphone.

FIG. 12 is circuit diagrams relating to modification example 2 to the second exemplary embodiment. Part (a) is a circuit diagram of headset main body 50. Part (b) is a circuit diagram of bone conduction microphone 1. Part (c) is a circuit diagram of sound microphone 57.

In the circuit diagram of modification example 1 described in FIG. 11, the stereo jack (three-polar jack) has been used as connector 190 of sound microphone 57. However, monaural jacks (bipolar jacks) are often used in an ordinary sound microphone. If a monaural jack connector is used in the circuit diagram of modification example 1, ring 172 (Rch) of connector 170 reaches GND. Therefore, a current cannot sometimes flow into chip 171 (Lch).

In view of this fact, modification example 2 will describe a circuit diagram where sound microphone 57 has connector 195 that is a monaural jack.

The circuit illustrated in FIG. 12 differs in configuration from the circuit illustrated in FIG. 11 in terms of two points described below. First, one of the two points is that connector 195 of sound microphone 57 is a monaural jack (bipolar jack). Further, the other of the two points is that a circuit including transistor 174 and transistor 175 is provided between ring 172 (Rch) of connector 170 of headset main body 50 and controller 55.

How the circuit illustrated in FIG. 12 operates will be described below.

When connector 195 (monaural jack) of sound microphone 57 is inserted into connector 170 of headset main body 50, ring 172 (Rch) of connector 170 reaches GND. A base of transistor 174 reaches 0 V. A collector of transistor 174 attains High. A gate of transistor 175 attains High. Transistor 175 is thus turned OFF. Therefore, no current flows into ring 172 (Rch) of connector 170. However, when PTT switch 62 of headset main body 50 is turned on, a current flows into chip 171 (Lch) of connector 170.

On the other hand, when connector 180 of bone conduction microphone 1 is inserted into connector 170 of headset main body 50, ring 172 (Rch) does not reach GND. Therefore, a voltage is applied to the base of transistor 174. The base of transistor 174 attains High. An emitter of transistor 174 attains Low. As a result, the collector of transistor 174 attains Low. A gate of transistor 175 then attains Low. Transistor 175 is turned ON. As a result, a current flows into ring 172 (Rch) of connector 170.

Next, circuits will be described with reference to FIGS. 13, 14 in a case in which controller 55 of headset main body 50 sends sound collected with a microphone to transceiver 7, and a case in which controller 55 outputs the sound received from transceiver 7 to bone conduction speakers 51.

Figure 13:
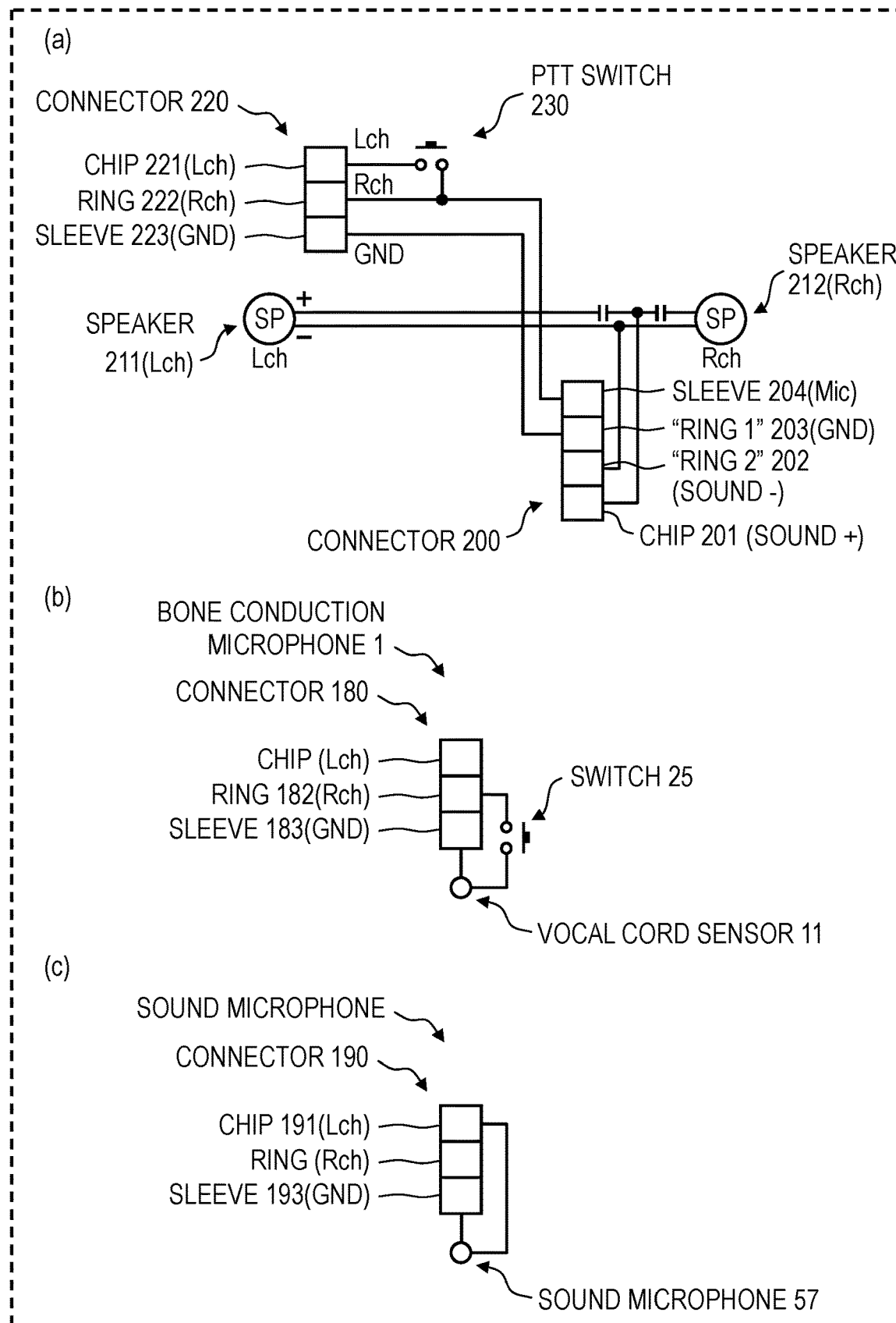
FIG. 13 is circuit diagrams relating to modification example 3 to the second exemplary embodiment, including a circuit diagram of a headset main body, a circuit diagram of a bone conduction microphone, and a circuit diagram of a sound microphone.

FIG. 13 is circuit diagrams relating to modification example 3 to the second exemplary embodiment. Part (a) is a circuit diagram of headset main body 50. Part (b) is a circuit diagram of bone conduction microphone 1. Part (c) is a circuit diagram of sound microphone 57.

In modification example 3 illustrated in FIG. 13, sound microphone 57 and bone conduction microphone 1 are selectively coupled to connector 220 of headset main body 50. Transceiver 7 is coupled to connector 200 of headset main body 50. Connector 200 lies at a tip of headset cable 6. As an example, connector 220 to the microphone is a three-polar jack (female), while connector 200 to transceiver 7 is a four-pole plug (male). Here, it is supposed that transceiver 7 to be coupled to headset main body 50 is such a type of a transceiver (hereinafter referred to as type A transceiver) that is configured to detect that the PTT switch is pressed, through a voltage drop (e.g. from 3 V to 2 V) at sleeve 204 of connector 200.

As illustrated in part (a) of FIG. 13, chip 221 (Lch) of connector 220 is coupled to sleeve 204 (Mic) of connector 200 via PTT switch 230. Ring 222 (Rch) of connector 220 is coupled to sleeve 204 of connector 200. Sleeve 223 (GND) of connector 220 is coupled to ring 1_203 (GND) of connector 200. Ring 2_202 (sound−) and chip 201 (sound+) of connector 200 are both coupled to speaker 211 (Lch) and speaker 212 (Rch).

The circuit diagram of the bone conduction microphone in part (b) of FIG. 13 and the circuit of sound microphone 57 in part (c) of FIG. 13 are respectively similar to the circuit diagrams in parts (b), (c) of FIG. 11. Therefore, descriptions are omitted in here.

Next, operations when two kinds of microphones are each combined with a type A transceiver will be described.

Combination of Sound Microphone and Type A Transceiver

When sound microphone 57 is used in headset main body 50, PTT switch 230 of headset main body 50 is used to achieve a PTT function. Sleeve 204 of connector 200 is coupled, via chip 221 of connector 220, chip 191 of connector 190, sound microphone 57, sleeve 193 of connector 190, and sleeve 223 of connector 220, to GND (ring 1_203 of connector 200). Therefore, when PTT switch 230 is pressed, a voltage drop occurs. Transceiver 7 detects the voltage drop at sleeve 204 of connector 200 to detect that PTT switch 230 is pressed.

Combination of Bone Conduction Microphone and Type A Transceiver

When bone conduction microphone 1 is used in headset main body 50, switch 25 of bone conduction microphone 1 is used to achieve a PTT function. Sleeve 204 of connector 200 is coupled, via ring 222 of connector 220, ring 182 of bone conduction microphone 1, switch 25, vocal cord sensor 11, sleeve 183 of bone conduction microphone 1, and sleeve 223 of connector 220, to GND (ring 1_203 of connector 200). Therefore, when switch 25 of bone conduction microphone 1 is pressed, a voltage drop occurs. Transceiver 7 detects the voltage drop at sleeve 204 of connector 200 to detect that the PTT switch is pressed.

As described above, in modification example 3, transceiver 7 can detect that PTT switch 230 is pressed, regardless of a kind of a microphone.

Next, modification example 4 to the second exemplary embodiment will be described below with reference to FIGS. 14 and 15A to 15F. FIG. 14 is circuit diagrams relating to modification example 4. Part (a) is a circuit diagram of headset main body 50. Part (b) is a circuit diagram of bone conduction microphone 1. Part (c) is a circuit diagram of sound microphone 57.

Figure 14:
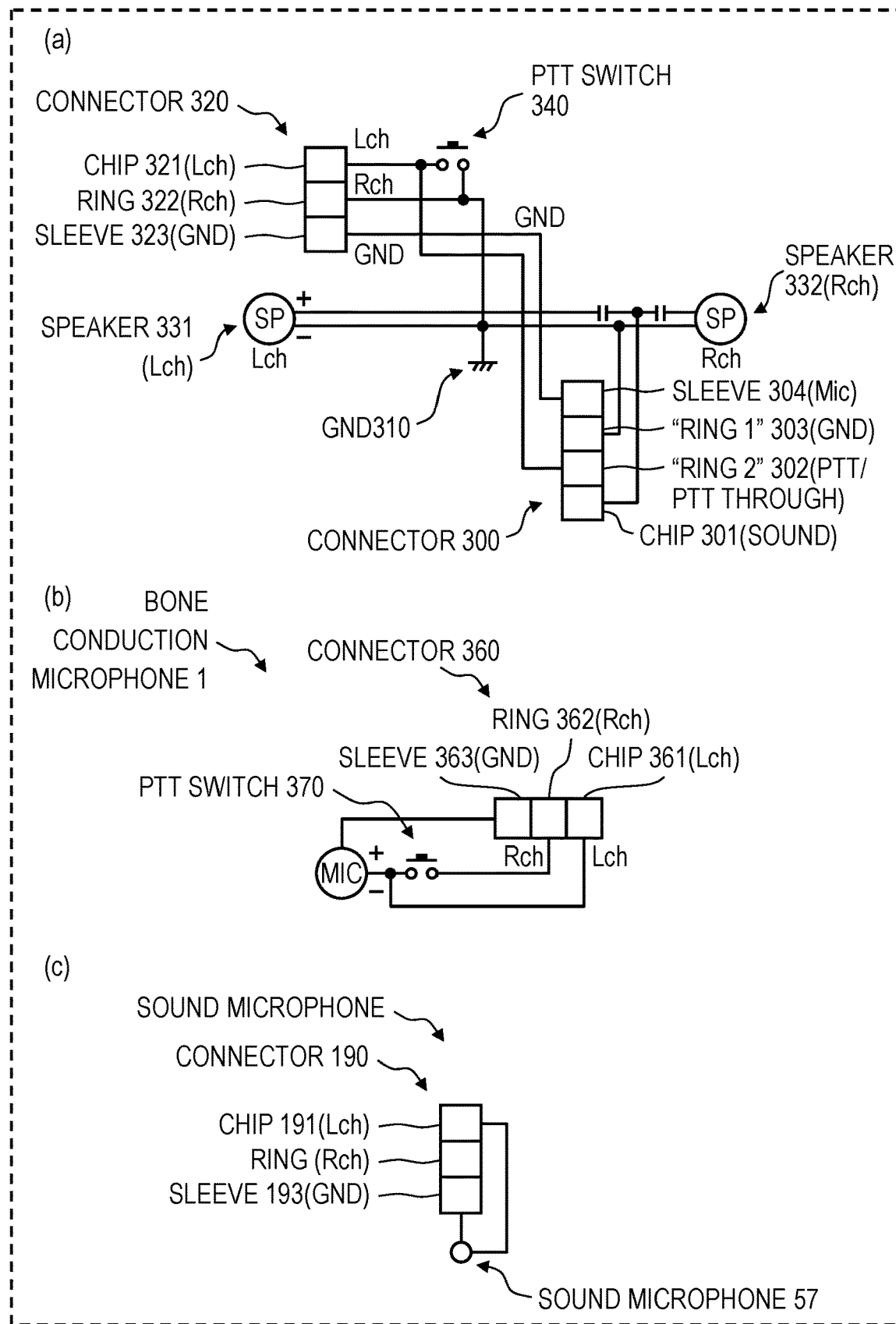
FIG. 14 is circuit diagrams relating to modification example 4 to the second exemplary embodiment, including a circuit diagram of a headset main body, a circuit diagram of a bone conduction microphone, and a circuit diagram of a sound microphone.

In modification example 4, sound microphone 57 and bone conduction microphone 1 illustrated in FIG. 14 are selectively coupled to connector 320 of headset main body 50. Transceiver 7 is coupled to connector 300 of headset main body 50. Connector 300 lies at a tip of headset cable 6. As an example, connector 320 to the microphone is a three-polar jack (female), while connector 300 to transceiver 7 is a four-pole plug (male).

In modification example 4, transceiver 7 to be coupled to headset main body 50 varies in kind. That is, three kinds of transceivers are available, such as type B transceiver and smartphone type transceiver, in addition to type A transceiver described above. A type B transceiver denotes a type of a transceiver configured to detect the PTT switch through a voltage drop (e.g. from 3 V to 0 V) at ring 2_302 of connector 300.

A smartphone type transceiver denotes a smartphone having a transceiver function configured to always turn a microphone on without detecting a PTT switch.

As illustrated in part (a) of FIG. 14, in headset main body 50, chip 321 (Lch) of connector 320 on a microphone side is coupled, via ring 2_302 of connector 300 on a transceiver side and PTT switch 340, to ring 1_303 of connector 300. Ring 322 (Rch) of connector 320 is coupled to ring 1_303 (GND) of connector 300. Sleeve 323 (GND) of connector 320 is coupled to sleeve 304 (Mic) of connector 300. Ring 1_303 and chip 301 of connector 300 are both coupled to left speaker 331 and right speaker 332.

As illustrated in part (b) of FIG. 14, connector 360 of bone conduction microphone 1 is a male stereo jack (three-polar jack). A signal picked by vocal cord sensor 11 is output, via chip 361 (Lch) of connector 360 and PTT switch 370, from ring 362 (Rch).

The circuit of the sound microphone in part (c) of FIG. 14 is similar to the circuit of the sound microphone illustrated in part (c) of FIG. 11. Therefore, here omits its description.

Next, operations when two kinds of microphones and three kinds of transceivers are respectively combined with each other will be described.

Combination of Sound Microphone and Type A Transceiver

Figure 15A:
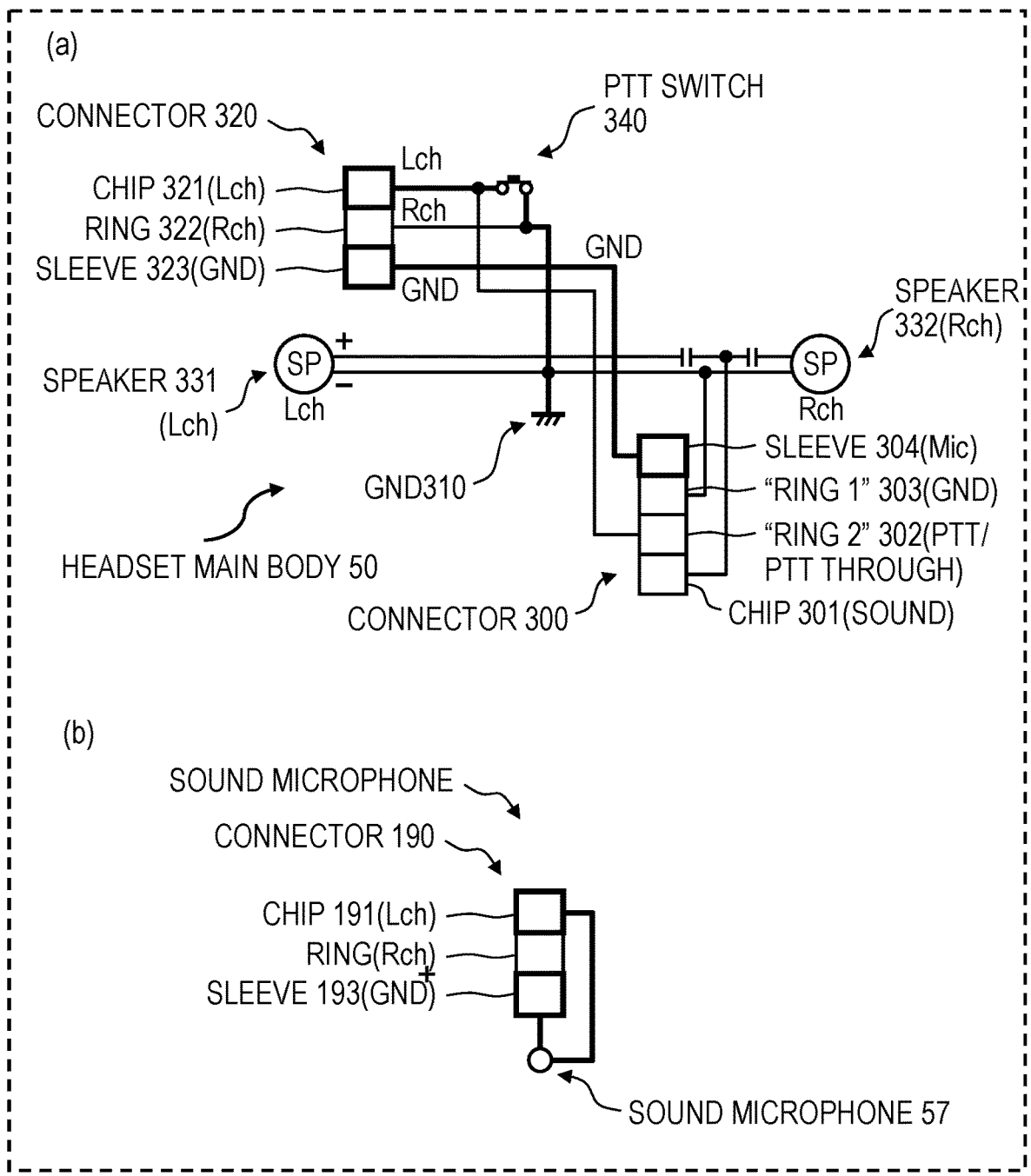
FIG. 15A is views relating to modification example 4 to the second exemplary embodiment for describing an operation when the headset main body is coupled with the sound microphone and a type A transceiver.

FIG. 15A is views for describing an operation when headset main body 50 is coupled with sound microphone 57 and transceiver 7 that is a type A transceiver.

When sound microphone 57 is used in headset main body 50, PTT switch 340 of headset main body 50 illustrated in part (a) is used to achieve a PTT function. Sleeve 304 of connector 300 is coupled, via sleeve 323 of connector 320, sleeve 193 of sound microphone 57, chip 191 of sound microphone 57, and PTT switch 340, to GND 310. Therefore, when PTT switch 340 is pressed, a voltage drop occurs. Transceiver 7 can detect the voltage drop at sleeve 304 of connector 300 to detect that PTT switch 340 is pressed. The configuration and the function of PTT switch 340 are similar to the configuration and the function of mute switch 64 in the second exemplary embodiment.

Combination of Bone Conduction Microphone and Type A Transceiver

Figure 15B:
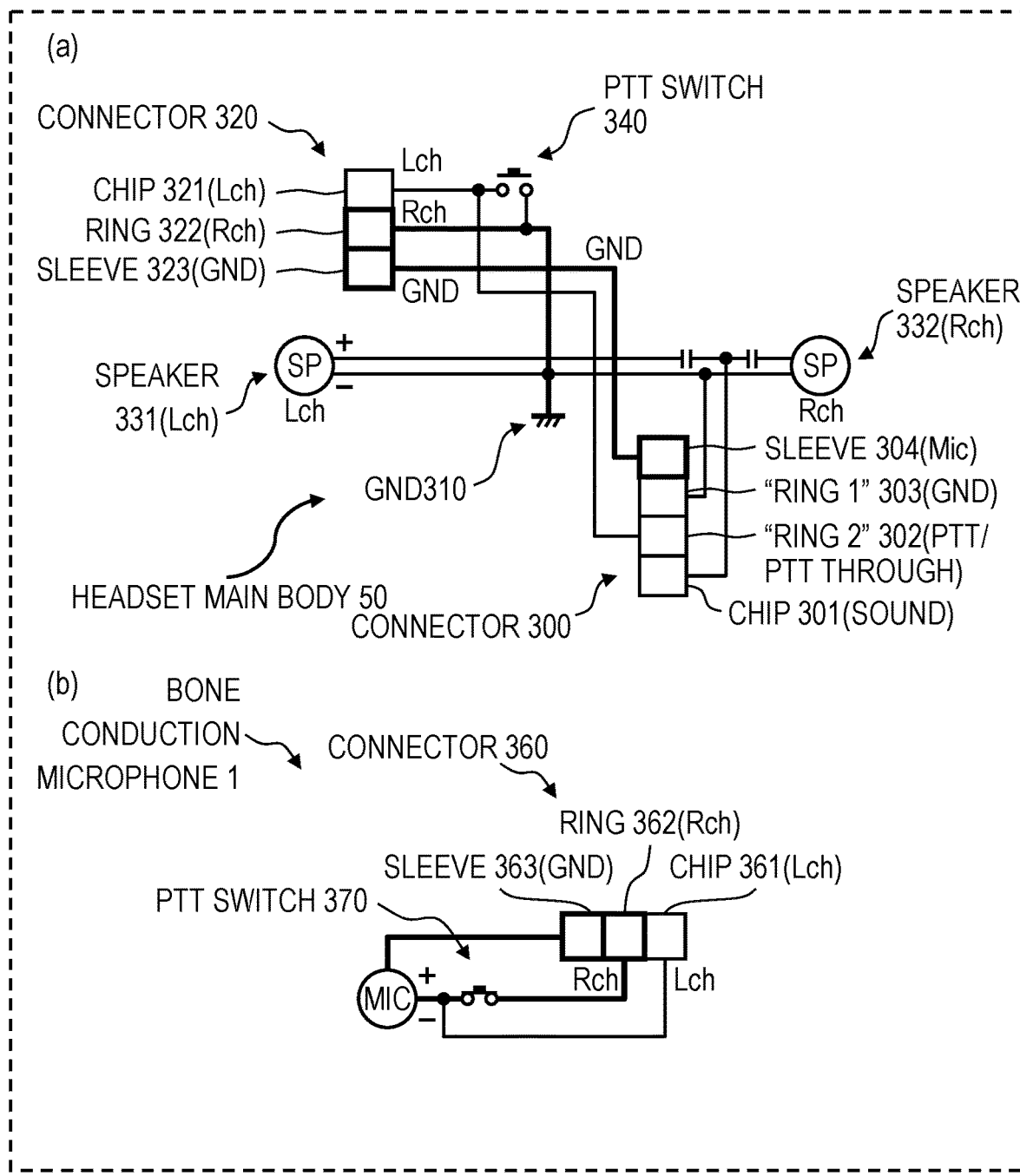
FIG. 15B is views relating to modification example 4 to the second exemplary embodiment for describing an operation when the headset main body is coupled with the bone conduction microphone and a type A transceiver.

FIG. 15B is views for describing an operation when headset main body 50 is coupled with bone conduction microphone 1 and transceiver 7 that is a type A transceiver.

When bone conduction microphone 1 is used in headset main body 50, PTT switch 370 of bone conduction microphone 1 illustrated in part (b) is used to achieve a PTT function. Sleeve 304 of connector 300 is coupled, via sleeve 323 of connector 320, sleeve 363 of bone conduction microphone 1, PTT switch 370, and ring 362 of bone conduction microphone 1, to GND 310. Therefore, when PTT switch 370 of bone conduction microphone 1 is pressed, a voltage drop occurs. Transceiver 7 can detect the voltage drop at sleeve 304 of connector 300 to detect that PTT switch 370 is pressed. The configuration and the function of PTT switch 370 are similar to the configuration and the function of switch 25 in the first exemplary embodiment.

Combination of Sound Microphone and Type B Transceiver

Figure 15C:
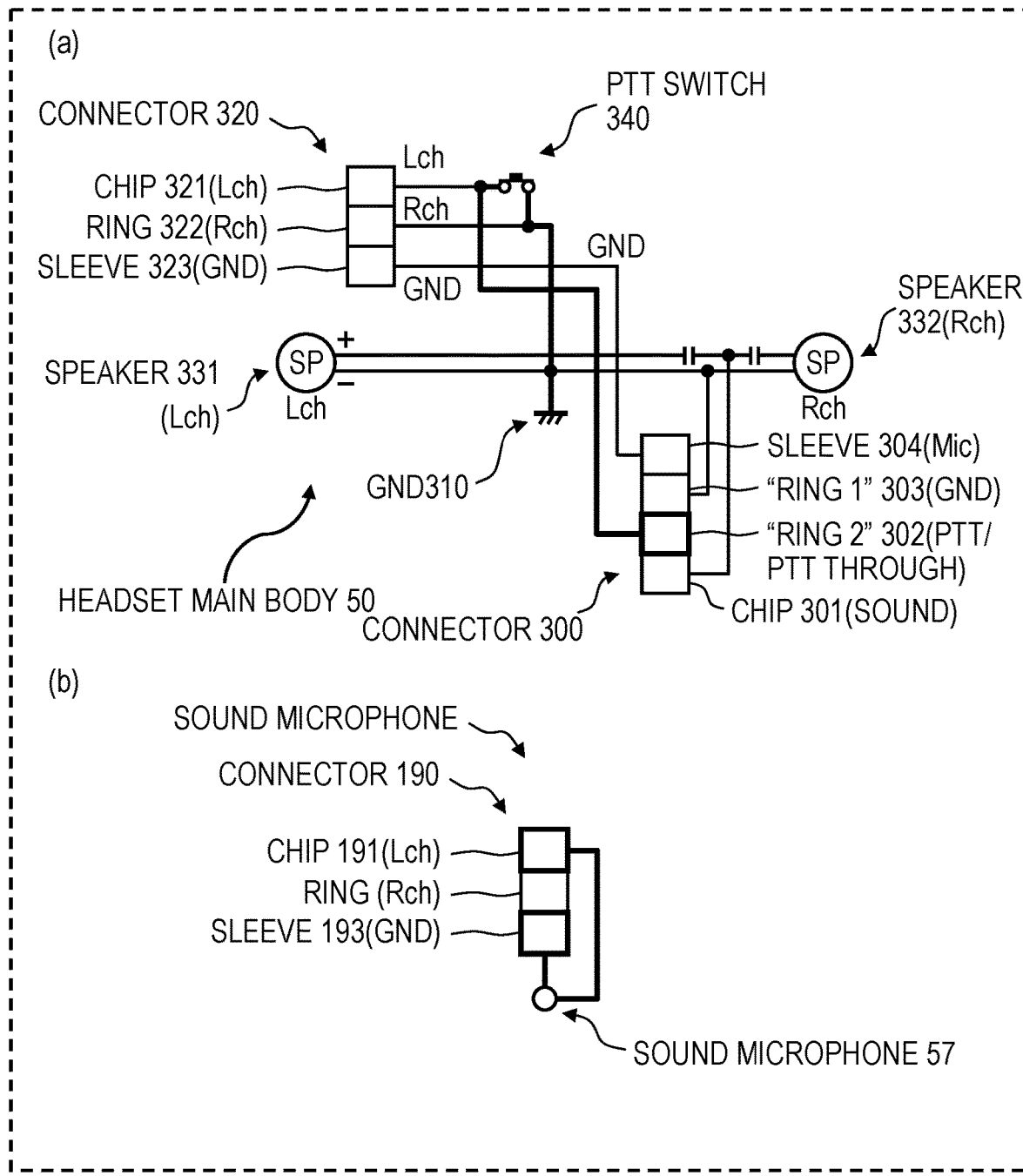
FIG. 15C is views relating to modification example 4 to the second exemplary embodiment for describing an operation when the headset main body is coupled with the sound microphone and a type B transceiver.

FIG. 15C is views for describing an operation when headset main body 50 is coupled with sound microphone 57 and transceiver 7 that is a type B transceiver.

When sound microphone 57 is used in headset main body 50, PTT switch 340 of headset main body 50 illustrated in part (a) is used to achieve a PTT function. While PTT switch 340 of headset main body 50 is not pressed, a voltage is supplied from transceiver 7 to sleeve 304 (Mic) of connector 300. The voltage is further supplied, via sleeve 323 of connector 320, sound microphone 57, and chip 321 of connector 320, to ring 2_302 (PTT through) of connector 300. On the other hand, when PTT switch 340 of headset main body 50 is pressed, ring 2_302 of connector 300 is coupled, via PTT switch 340, to GND 310. As a result, a voltage drop occurs. Transceiver 7 can detect the voltage drop at ring 2_302 of connector 300 to detect that the PTT switch is pressed.

Combination of Bone Conduction Microphone and Type B Transceiver

Figure 15D:
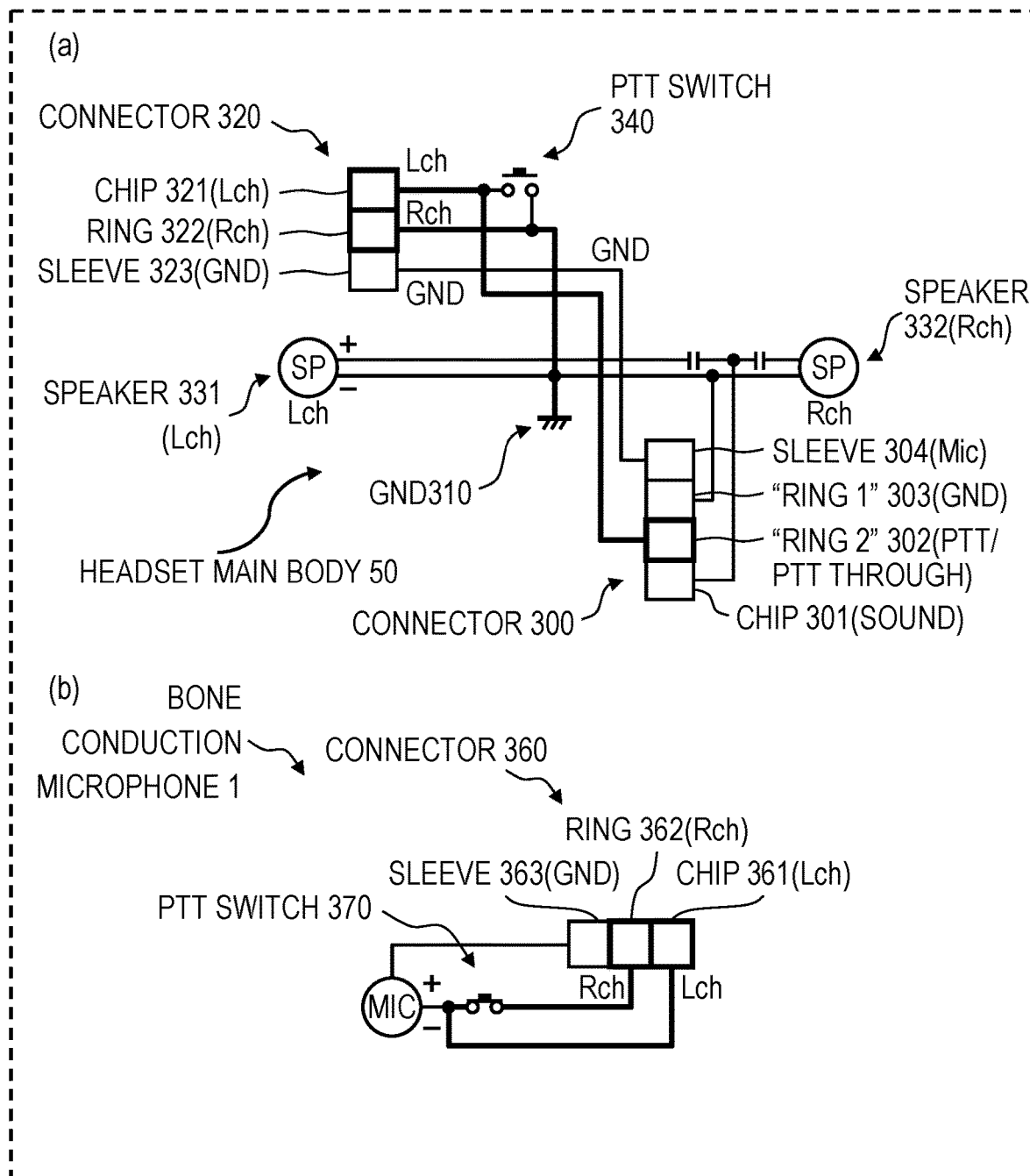
FIG. 15D is views relating to modification example 4 to the second exemplary embodiment for describing an operation when the headset main body is coupled with the bone conduction microphone and a type B transceiver.

FIG. 15D is views for describing an operation when headset main body 50 is coupled with bone conduction microphone 1 and transceiver 7 that is a type B transceiver.

When bone conduction microphone 1 is used in headset main body 50, PTT switch 370 of bone conduction microphone 1 illustrated in part (b) is used to achieve a PTT function. While PTT switch 370 of bone conduction microphone 1 is not pressed, a voltage is supplied from transceiver 7 to sleeve 304 of connector 300. The voltage is further supplied, via sleeve 323 of connector 320, sound microphone 57, and chip 321 of connector 320, to ring 2_302 (PTT through) of connector 300. On the other hand, when PTT switch 370 of bone conduction microphone 1 is pressed, ring 2_302 of connector 300 is coupled, via chip 361 of bone conduction microphone 1, PTT switch 370, and ring 362 of bone conduction microphone 1, to GND 310. As a result, a voltage drop occurs. Transceiver 7 detects the voltage drop at ring 2_302 of connector 300 to detect that the PTT switch is pressed.

Combination of Sound Microphone and Smartphone Type Transceiver

Figure 15E:
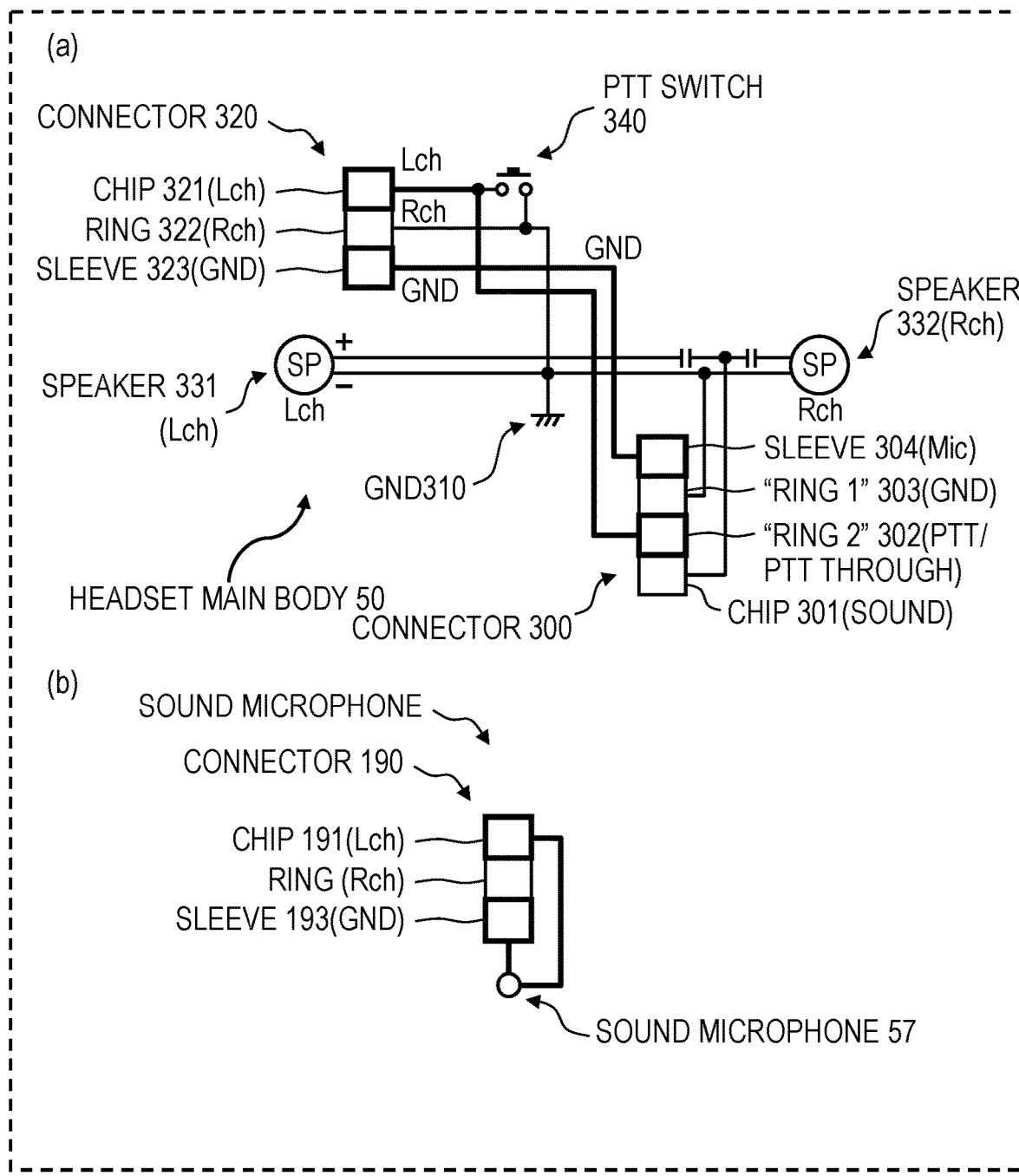
FIG. 15E is views relating to modification example 4 to the second exemplary embodiment for describing an operation when the headset main body is coupled with the sound microphone and a smartphone type transceiver.

FIG. 15E is views for describing an operation when headset main body 50 is coupled with sound microphone 57 and transceiver 7 that is a smartphone type transceiver.

To couple transceiver 7 that is a smartphone type transceiver to headset main body 50, a part (not illustrated) configured to short-circuit ring 1_303 and ring 2_302 of connector 300 illustrated in part (a) is to be inserted between connector 300 and transceiver 7. Below will be described an operation under a supposition that the part is inserted, and thus ring 1_303 and ring 2_302 of connector 300 are short-circuited.

Ring 2_302 of connector 300 is short-circuited with ring 1_303 of connector 300, and thus reaches GND. Chip 321 of connector 320 also reaches GND. At this time, chip 191 of connector 190 of sound microphone 57 illustrated in part (b) also reaches GND. As a result, sound microphone 57 attains a normally operating state. Therefore, even when a user does not press PTT switch 340 of headset main body 50, the user can use sound microphone 57 to make communications.

Combination of Bone Conduction Microphone and Smartphone Type Transceiver

Figure 15F:
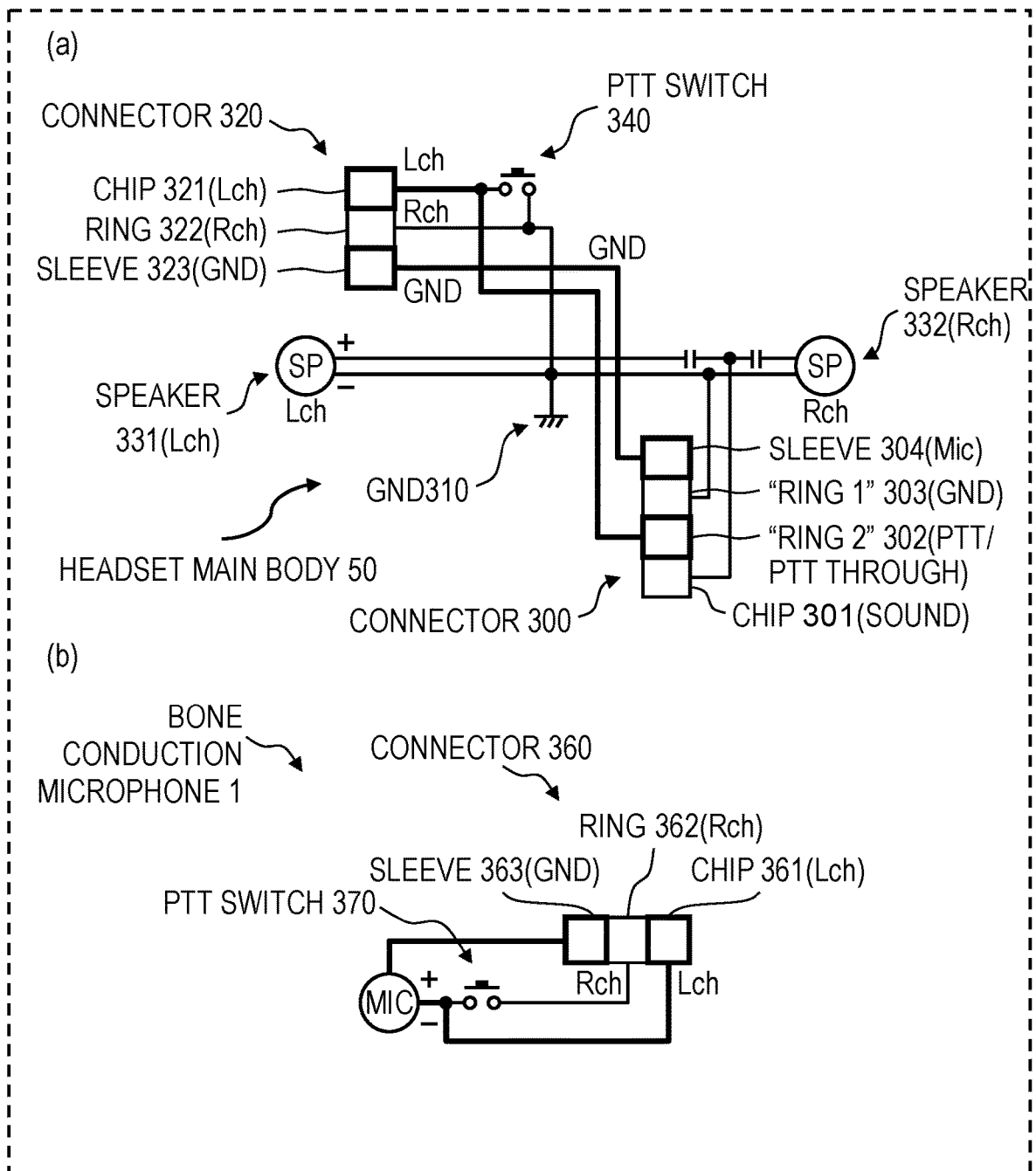
FIG. 15F is views relating to the modification example 4 to the second exemplary embodiment for describing an operation when the headset main body is coupled with the bone conduction microphone and a smartphone type transceiver.

FIG. 15F is views for describing an operation when headset main body 50 is coupled with bone conduction microphone 1 and transceiver 7 that is a smartphone type transceiver.

To couple a smartphone type transceiver to headset main body 50, a part (not illustrated) configured to short-circuit ring 1_303 and ring 2_302 of connector 300 illustrated in part (a) is to be inserted between connector 300 and transceiver 7. Herein will describe an operation under a supposition that the part is inserted, and thus ring 1_303 and ring 2_302 of connector 300 are short-circuited.

Ring 2_302 of connector 300 is short-circuited with ring 1_303 of connector 300, and thus reaches GND. Chip 321 of connector 320 also reaches GND. At this time, chip 361 of connector 360 of bone conduction microphone 1 illustrated in part (b) also reaches GND. As a result, bone conduction microphone 1 attains a normally operating state. Therefore, even when a user does not press PTT switch 370 of bone conduction microphone 1, the user can use bone conduction microphone 1 to make communications.

As described above, headset main body 50 according to modification example 4 can operate in any of the combinations of the two kinds of microphones and the three kinds of transceivers.

Effects and Other Benefits of Modification Example 4

As described above, modification example 4 is a bone conduction headset system, i.e., a sound input and output device, including headset main body 50 and a microphone device. Headset main body 50 includes PTT switch 340 serving as a communication switch, the bone conduction speakers, connector 320 serving as a first connector to be coupled with the microphone (1, 57), and connector 300 serving as a second connector to be coupled with transceiver 7. Connector 320 includes the three contacts of sleeve 323, ring 322, and chip 321 arranged in this order. Connector 300 includes the four contacts of sleeve 304, ring 1_303, ring 2_302, and chip 301 arranged in this order. Sleeve 304 of connector 320 is coupled to sleeve 323 of connector 300. Ring 322 of connector 320 is coupled to a ground. Chip 321 of connector 320 is coupled to ring 2_302 of connector 300, as well as is coupled, via PTT switch 340, to the ground. The microphone device includes the microphone (1, 57), and the connector (360, 190) serving as a third connector configured to couple the microphone (1, 57) to headset main body 50. The connector (360, 190) includes the three contacts of the chip (361, 191), the ring (362), and the sleeve (363, 193) arranged in this order. The sleeve (363, 193) of the connector (360, 190) is coupled to one of terminals of the microphone (1, 57). The chip (361, 191) of the connector (360, 190) is coupled to another one of the terminals of the microphone (1, 57). The connector (360, 190) is coupled to connector 320 of headset main body 50.

Therefore, the bone conduction headset system can detect that PTT switch 340 is pressed even when a transceiver coupled to connector 300 is either of type A and type B.

In the bone conduction headset system according to modification example 4, connector 320 is the three-polar jack including the three contacts of sleeve 323, ring 322, and chip 321 arranged in this order from a plug insertion port. Connector 300 is the four-polar jack including the four contacts of sleeve 304, ring 1_303, ring 2_302, and chip 301 arranged in this order from a plug insertion port. The connector (360, 190) is the three-pole plug including the three contacts of the chip (361, 191), the ring (362), and the sleeve (363, 193) arranged in this order from a tip. When the connector (360, 190) that is the three-pole plug is inserted into the connector (320) that is the three-polar jack, the microphone (1, 57) is coupled to headset main body 50.

Therefore, the bone conduction headset system can detect that PTT switch 340 is pressed even when a transceiver coupled to connector 300 is either of type A and type B.

Modification example 4 is a bone conduction headset system including headset main body 50 and bone conduction microphone 1. Headset main body 50 includes PTT switch 340, the bone conduction speakers, connector 320 coupled with bone conduction microphone 1, and connector 300 coupled with transceiver 7. Connector 320 includes the three contacts of sleeve 323, ring 322, and chip 321 arranged in this order. Connector 300 includes the four contacts of sleeve 304, ring 1_303, ring 2_302, and chip 301 arranged in this order. Sleeve 304 of connector 320 is coupled to sleeve 323 of connector 300. Ring 322 of connector 320 is coupled to the ground. Chip 321 of connector 320 is coupled to ring 2_302 of connector 300, as well as is coupled, via PTT switch 340, to the ground. The microphone device includes bone conduction microphone 1, connector 360 configured to couple bone conduction microphone 1 to headset main body 50, and PTT switch 370. Connector 360 includes the three contacts of chip 361, ring 362, and sleeve 363 arranged in this order. Sleeve 363 is coupled to a positive side terminal of bone conduction microphone 1. Chip 361 is coupled to a negative side terminal of bone conduction microphone 1. Ring 362 is coupled, via PTT switch 370, to the negative side terminal of bone conduction microphone 1.

Therefore, the bone conduction headset system can detect that PTT switch 340 is pressed even when a transceiver coupled to connector 300 is either of type A and type B. Further, when bone conduction microphone 1 is coupled to connector 300, PTT switch 370 of bone conduction microphone 1 can be used to make communications.

In the bone conduction headset system according to modification example 4, the bone conduction speakers include left speaker 331 and right speaker 332. Ring 1_303 of connector 300 is coupled to one of left speaker 331 and right speaker 332. Chip 301 of connector 300 is coupled to the other of left speaker 331 and right speaker 332.

Therefore, the bone conduction headset system can output, from left speaker 331 and right speaker 332, sound entered through transceiver 7 coupled to connector 300.

In the bone conduction headset system according to modification example 4, when connector 300 is coupled to transceiver 7 that is a smartphone type transceiver, ring 1_303 and ring 2_302 of connector 300 are short-circuited. For example, a part configured to short-circuit ring 1_303 and ring 2_302 may be inserted between connector 300 and transceiver 7.

Therefore, ring 2_302 of connector 300 is short-circuited with ring 1_303 of connector 300, and thus reaches the ground. Chip 321 of connector 320 also reaches the ground. In this case, chip 361 of connector 360 coupled to connector 320 also reaches the ground. As a result, bone conduction microphone 1 attains a normally operating state. Chip 191 of connector 190 coupled to connector 320 also reaches the ground. As a result, sound microphone 57 attains a normally operating state. Therefore, even when PTT switch 340 and PTT switch 370 are not pressed, communications are possible. As described above, the bone conduction headset system normally operates even when a transceiver coupled to connector 300 is a smartphone type transceiver.

Modification example 4 is headset main body 50 including PTT switch 340, the bone conduction speakers, connector 320 coupled with a microphone, and connector 300 coupled with transceiver 7. Connector 320 includes the three contacts of sleeve 323, ring 322, and chip 321 arranged in this order. Connector 300 includes the four contacts of sleeve 304, ring 1_303, ring 2_302, and chip 301 arranged in this order. Sleeve 304 of connector 320 is coupled to sleeve 323 of connector 300. Ring 322 of connector 320 is coupled to the ground. Chip 321 of connector 320 is coupled to ring 2_302 of connector 300, as well as is coupled, via PTT switch 340, to the ground.

Therefore, headset main body 50 can detect that PTT switch 340 is pressed even when a transceiver coupled to connector 300 is either type A or type B.

In headset main body 50 according to modification example 4, connector 320 is the three-polar jack including the three contacts of sleeve 323, ring 322, and chip 321 arranged in this order from a plug insertion port. Connector 300 is the four-polar jack including the four contacts of sleeve 304, ring 1_303, ring 2_302, and chip 301 arranged in this order from a plug insertion port.

Therefore, headset main body 50 can detect that PTT switch 340 is pressed even when a transceiver coupled to connector 300 is either type A or type B.

In headset main body 50 according to modification example 4, the bone conduction speakers include left speaker 331 and right speaker 332. Ring 1_303 of connector 300 is coupled to one of left speaker 331 and right speaker 332. Chip 301 of connector 300 is coupled to the other of left speaker 331 and right speaker 332.

Therefore, headset main body 50 can output, from left speaker 331 and right speaker 332, sound entered through transceiver 7 coupled to connector 300.

In headset main body 50 according to modification example 4, when connector 300 is coupled with transceiver 7 that is a smartphone type transceiver, ring 1_303 and ring 2_302 of connector 300 are short-circuited. For example, a part configured to short-circuit ring 1_303 and ring 2_302 may be inserted between connector 300 and transceiver 7.

Therefore, ring 2_302 of connector 300 is short-circuited with ring 1_303 of connector 300, and thus reaches the ground. Chip 321 of connector 320 also reaches the ground. In this case, chip 361 of connector 360 coupled to connector 320 also reaches the ground. As a result, bone conduction microphone 1 attains a normally operating state. Chip 191 of connector 190 coupled to connector 320 also reaches the ground. As a result, sound microphone 57 attains a normally operating state. Therefore, even when PTT switch 340 and PTT switch 370 are not pressed, conversations are possible. As described above, headset main body 50 normally operates even when a transceiver coupled to connector 300 is a smartphone type transceiver.

Other Exemplary Embodiments

As described above, the exemplary embodiments and the modification examples have been described as examples of the technique in the present disclosure. For that purpose, the accompanying drawings and the detailed description have been provided.

The components illustrated in the accompanying drawings and described in the detailed description can include components essential for solving the problems, as well as components that are not essential for solving the problems but required to describe the above techniques as an example. For this reason, it should not be immediately recognized that those unnecessary components are necessary just because those unnecessary components are described in the accompanying drawings and the detailed description.

The above exemplary embodiments and the modification examples are provided to exemplify the technique according to the present disclosure, and various changes, replacements, additions, omissions, and the like can be made within the scope of the claims and equivalents thereof.

For example, vocal cord sensor 11 is not limited to a piezoelectric element, but may be a vibration detection element such as acceleration pickup gauge or differential transformer.

For example, contact member 12, housing 21, and cover 22 may not each have a cylindrical shape, but may each have a rectangular tubular shape.

For example, the second exemplary embodiment has illustrated an example where, when bone conduction headset 5A is worn, central part 54a of support body 54 is arranged behind the head. However, the present disclosure is not limited to the example. Such a structure may be applicable that central part 54a is to be arranged on the head.

The second exemplary embodiment has illustrated an example where, when bone conduction headset 5A is worn, support body 54 being formed bypasses the lower sides of the ears. However, the present disclosure is not limited to the example. Such a structure may be applicable that support body 54 has a shape extending along upper sides of the ears, and support body 54 can be hooked on the ears.

The second exemplary embodiment has illustrated an example where, while mute switch 64 is pressed, volume of sound signals sent from transceiver 7 lowers, whereas, when mute switch 64 is released, the volume of sound signals sent from transceiver 7 returns to its original degree. However, the present disclosure is not limited to the configuration. Such a configuration may be applicable that, when mute switch 64 is pressed once, volume lowers, and, when mute switch 64 is pressed again, the volume returns to its original degree.

Modification example 4 to the exemplary embodiment has explained that connector 320 of headset main body 50 is a three-polar jack (female), whereas connector 300 is a four-pole plug (male). However, this is merely an example. The present disclosure is not limited to the example. Such jacks and plugs may be applicable that conform to shapes of connector 190 of sound microphone 57, connector 360 of bone conduction microphone 1, and the connector of transceiver 7, which are to be coupled to headset main body 50. For example, connector 320 may be a three-pole plug, whereas connector 300 may be a four-polar jack.

INDUSTRIAL APPLICABILITY

The present disclosure is applicable to a bone conduction microphone configured to come into contact with a human body and collect vocal cord vibration. The present disclosure is also applicable to a sound input and output device used when a construction site helmet, a motorcycle helmet, a headphone, or an intercommunication (in-com) device, for example, is worn on the head to make communications with a communication partner.

REFERENCE MARKS IN THE DRAWINGS

1: bone conduction microphone (microphone)
2: helmet
3: chin strap
4: microphone cable
5, 5A: bone conduction headset
6: headset cable
7: transceiver
9, 9A: communication device
10: vibration collection unit
11: vocal cord sensor
12: contact member
12a: contact part
12b: side surface part
12c: opening part
13: pressing member
21: housing
21a: base
21b: pillar
21c: end face
21d: switch fixing part
22: cover
22a: opening
23: packing
25: switch
25a: operation unit
26: metal fixture
30: diaphragm
30a: lower surface
30b: upper surface
50: headset main body (sound input and output device)
51: speaker (bone conduction speaker)
52: ear hook
54: support body
54a: central part
54b: end (first end)
54c: end (second end)
54b1, 54c1: outside surface
55: controller
57: sound microphone (microphone)
58: microphone holder
59: coupler
62, 230, 340, 370: PTT switch (communication switch)
64: mute switch
71: signal line
72: sound line
73: input unit
190, 360: connector (third connector)
300: connector (second connector)
320: connector (first connector)
P1: pressing force
s1: stroke

The invention claimed is:

1. A bone conduction microphone configured to convert vocal cord vibration into a sound signal, the bone conduction microphone comprising:
 a vibration collection unit configured to come into contact with a human body and collect vibration in a predetermined direction, the vibration being included in vocal cord vibration; and
 a switch configured to switch whether collection of the vibration in the predetermined direction is enabled,
wherein the switch is disposed on a side of the vibration collection unit, the side being opposite to a side configured to come into contact with the human body, to allow a direction of an operation of switching whether the collection of the vibration in the predetermined direction is enabled to be parallel to the predetermined direction,
the vibration collection unit includes:
 a contact member configured to come into contact with the human body; and
 a vocal cord sensor configured to detect vibration in the predetermined direction via the contact member,
the bone conduction microphone further includes a housing configured to support at least a part of the contact member and the switch,
the contact member is an elastic body softer than the housing,
the bone conduction microphone further includes a diaphragm positioned between the vibration collection unit and the housing,
the vibration collection unit is supported by the housing via the diaphragm,
the housing has a tubular shape,
the vibration collection unit is supported by the housing via the diaphragm to allow position displacement to occur in an operation direction of the switch, and
the switch is disposed in the housing in a direction of position displacement of the vibration collection unit, the switch being configured to be turned on when position displacement occurs on the vibration collection unit, and when the vibration collection unit presses the switch.

2. The bone conduction microphone according to claim 1, wherein
the switch is configured to be turned on when the vibration collection unit is pressed onto the human body, and to be turned off when the vibration collection unit is detached from the human body, and
the vibration collection unit is configured to collect vibration in the predetermined direction when the switch is in an on state, and not to collect vibration in the predetermined direction when the switch is in an off state.

3. The bone conduction microphone according to claim 1, wherein the diaphragm is an elastic body softer than the contact member.

4. The bone conduction microphone according to claim 1, wherein the vibration collection unit and the switch are disposed in the housing to allow central axes extending in the direction of position displacement to align with each other.

5. The bone conduction microphone according to claim 1, wherein
the vocal cord sensor is a piezoelectric element configured to allow thickness vibration to occur, and
a thickness direction of the piezoelectric element is identical to the predetermined direction.

6. A bone conduction headset comprising:
the bone conduction microphone according to claim 1; and
a speaker.

7. A communication device comprising:
the bone conduction headset according to claim 6; and
a transceiver configured to perform, when coupled to the bone conduction headset, communications with an external device.

8. A communication device comprising:

the bone conduction microphone according to claim 1; and a transceiver configured to perform, when coupled to the bone conduction microphone, communications with an external device.

* * * * *